(12) United States Patent
Kelly

(10) Patent No.: US 7,673,548 B2
(45) Date of Patent: Mar. 9, 2010

(54) CUTTING WORKSTATION RIP FENCE AND MITER GAUGE

(76) Inventor: William Kelly, 1017 N. Logan St., P.O. Box 671, Lincoln, IL (US) 62656

(*) Notice: Subject to any disclaimer, the term of this patent is extended or adjusted under 35 U.S.C. 154(b) by 145 days.

(21) Appl. No.: 11/787,484

(22) Filed: Apr. 16, 2007

(65) Prior Publication Data

US 2007/0246123 A1 Oct. 25, 2007

(51) Int. Cl.
*B26D 5/00* (2006.01)
*B27B 5/25* (2006.01)

(52) U.S. Cl. .............. 83/581; 83/435.11; 83/477.1; 83/477.2; 83/473; 83/485

(58) Field of Classification Search ............ 83/477.2, 83/859, 432, 435, 168, 169, 171, 435.1, 581, 83/473, 435.11, 485, 486, 486.1, 412, 487–489, 83/437, 477.1, 699.51, 471.1, 483, 471.2, 83/471.3, 478; 144/286.1, 286, 11, 2.1, 285, 144/287, 326

See application file for complete search history.

(56) References Cited

U.S. PATENT DOCUMENTS

| 2,710,633 | A | * | 6/1955 | Oberg | 83/435.14 |
| 3,604,482 | A | * | 9/1971 | Warrick et al. | 83/473 |
| 3,807,095 | A | * | 4/1974 | Harding et al. | 125/13.03 |
| 4,152,961 | A | * | 5/1979 | Batson | 83/471.3 |
| 4,259,887 | A | * | 4/1981 | Dean | 83/435.14 |
| 6,276,990 | B1 | * | 8/2001 | Greenland | 451/11 |
| 7,219,585 | B1 | * | 5/2007 | Kelly | 83/581 |
| 7,481,141 | B2 | * | 1/2009 | Kelly | 83/581 |

* cited by examiner

*Primary Examiner*—Ghassem Alie

(57) ABSTRACT

A cutting workstation which includes a miter gauge. The miter gauge consists of a clamping means whereby the gauge may be fixed to any location upon the length of cutting station work surface. The miter gauge arm is hinged to clamping means by a plate which may be rotated and then fixed at any angle. The arm is extendable and at its distal end exhibits a T shaped plate and fence which itself may be rotated to any angle. The ability to fix the miter gauge at any position along the cutting station work surface along with two means of adjusting angles allows the fence to guide the work piece at virtually any angle.

1 Claim, 26 Drawing Sheets

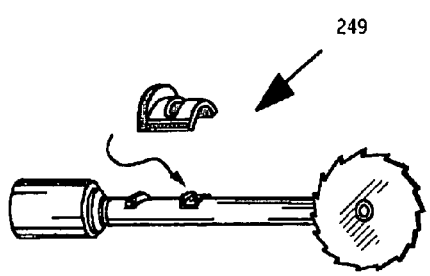
FIG. 1D
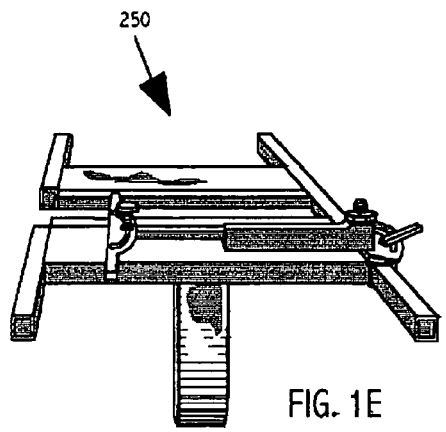
FIG. 1E
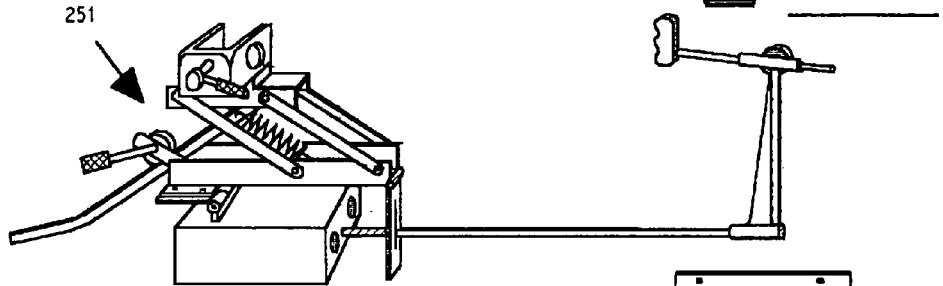
FIG. 1G
FIG. 1F
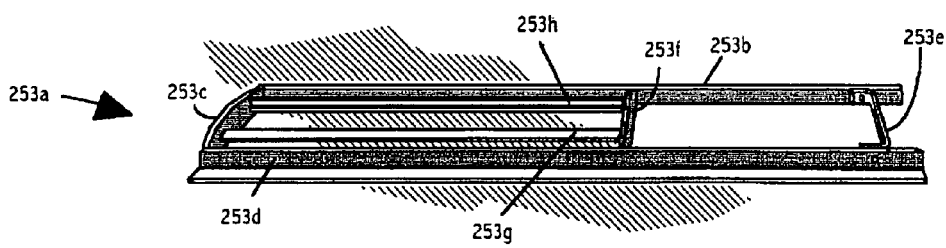
FIG. 1H

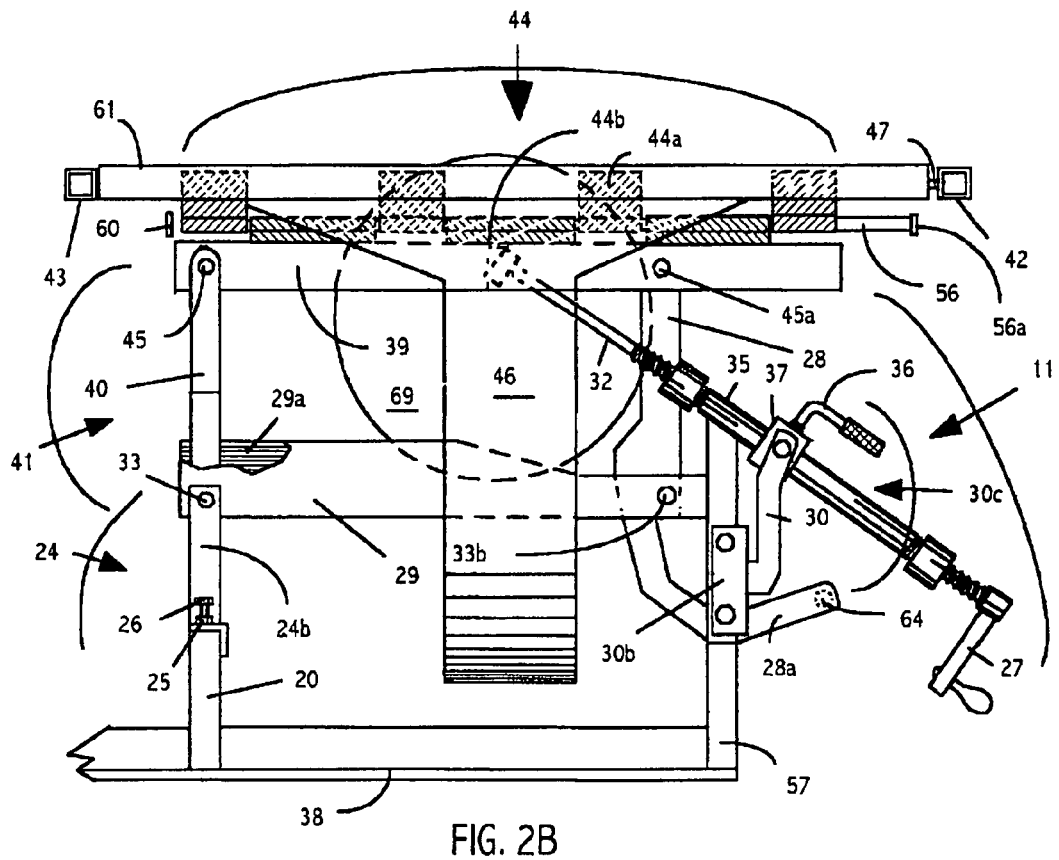
FIG. 2B
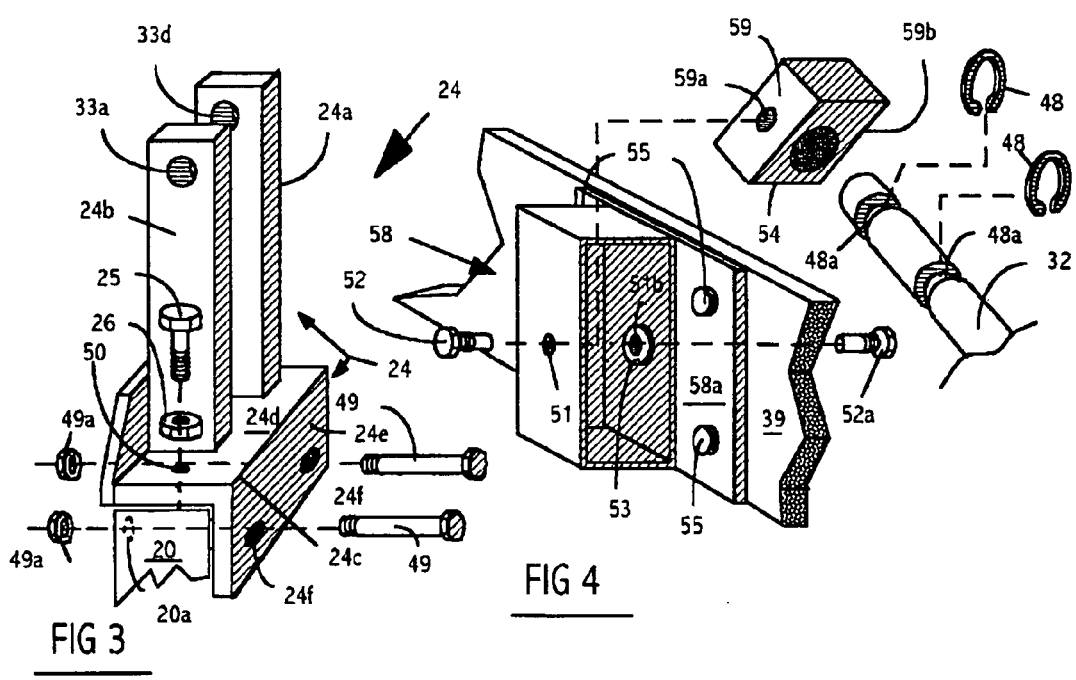
FIG 3
FIG 4

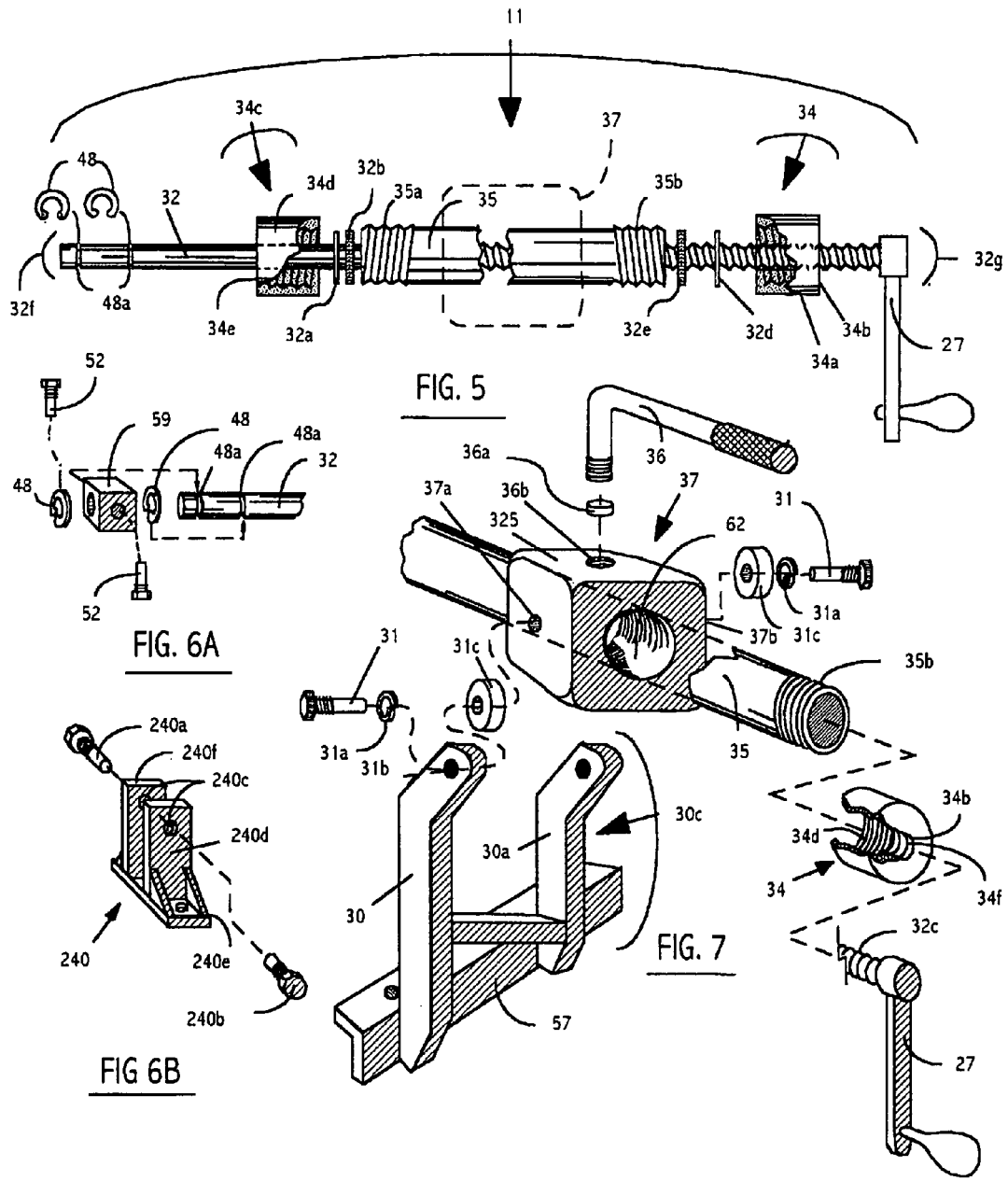

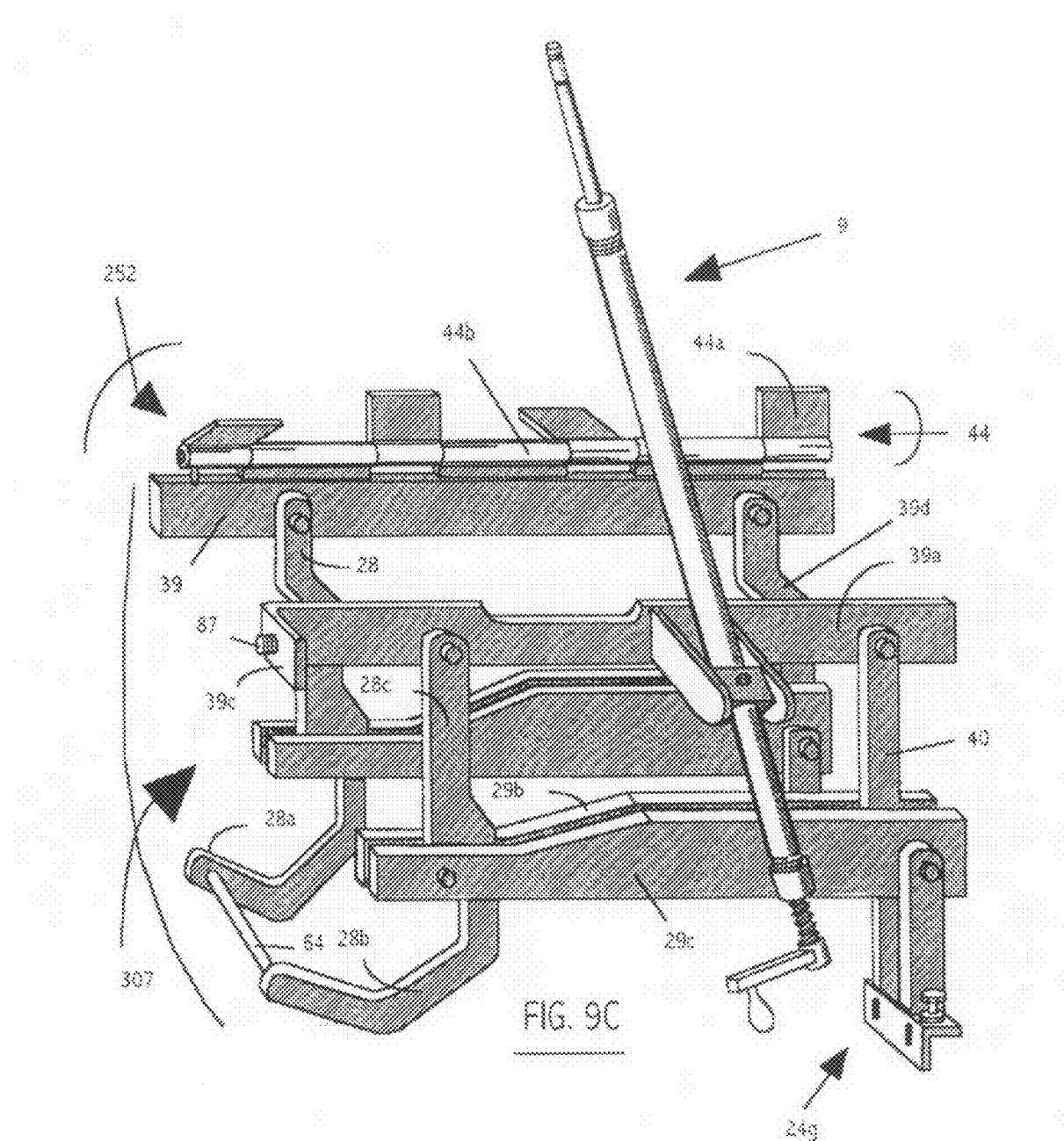

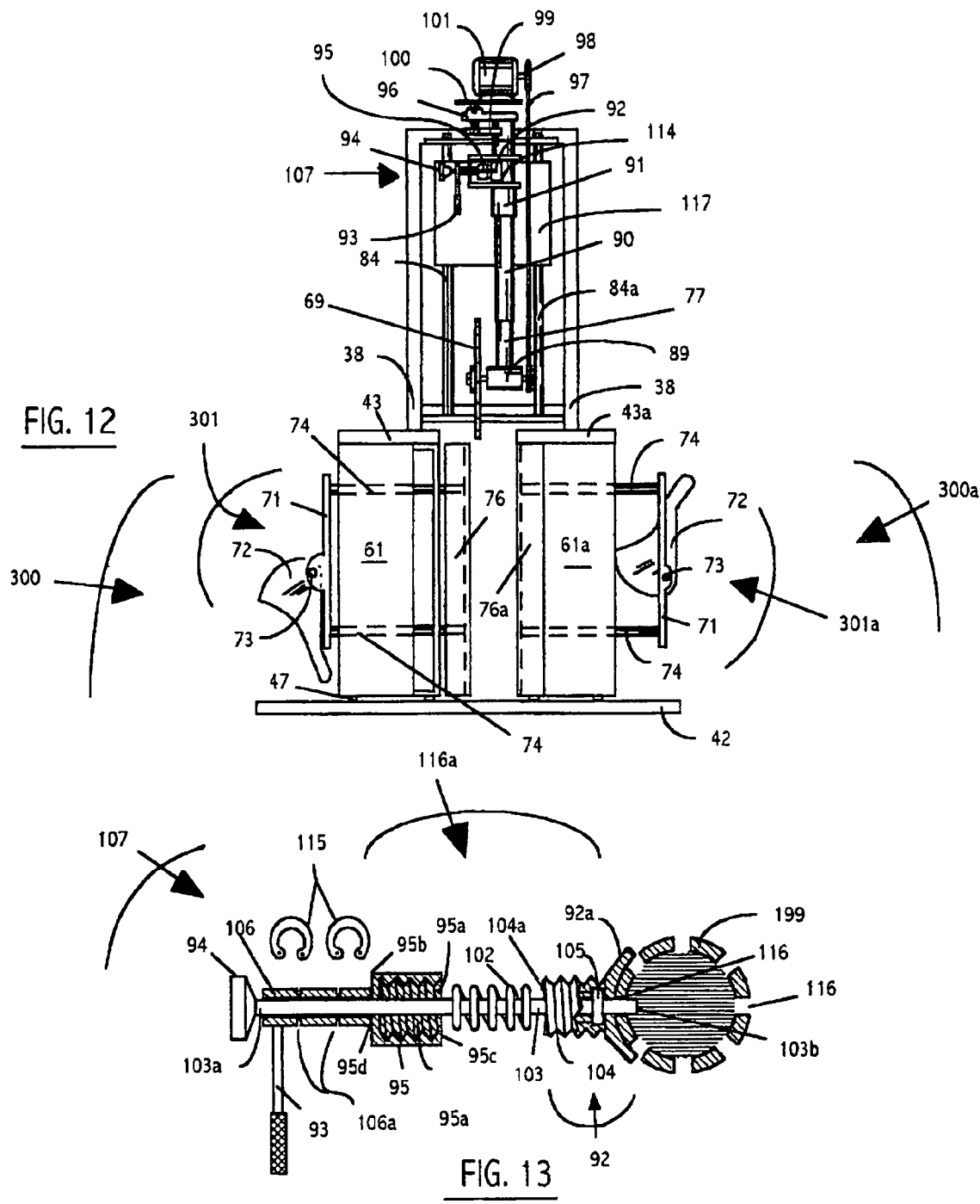

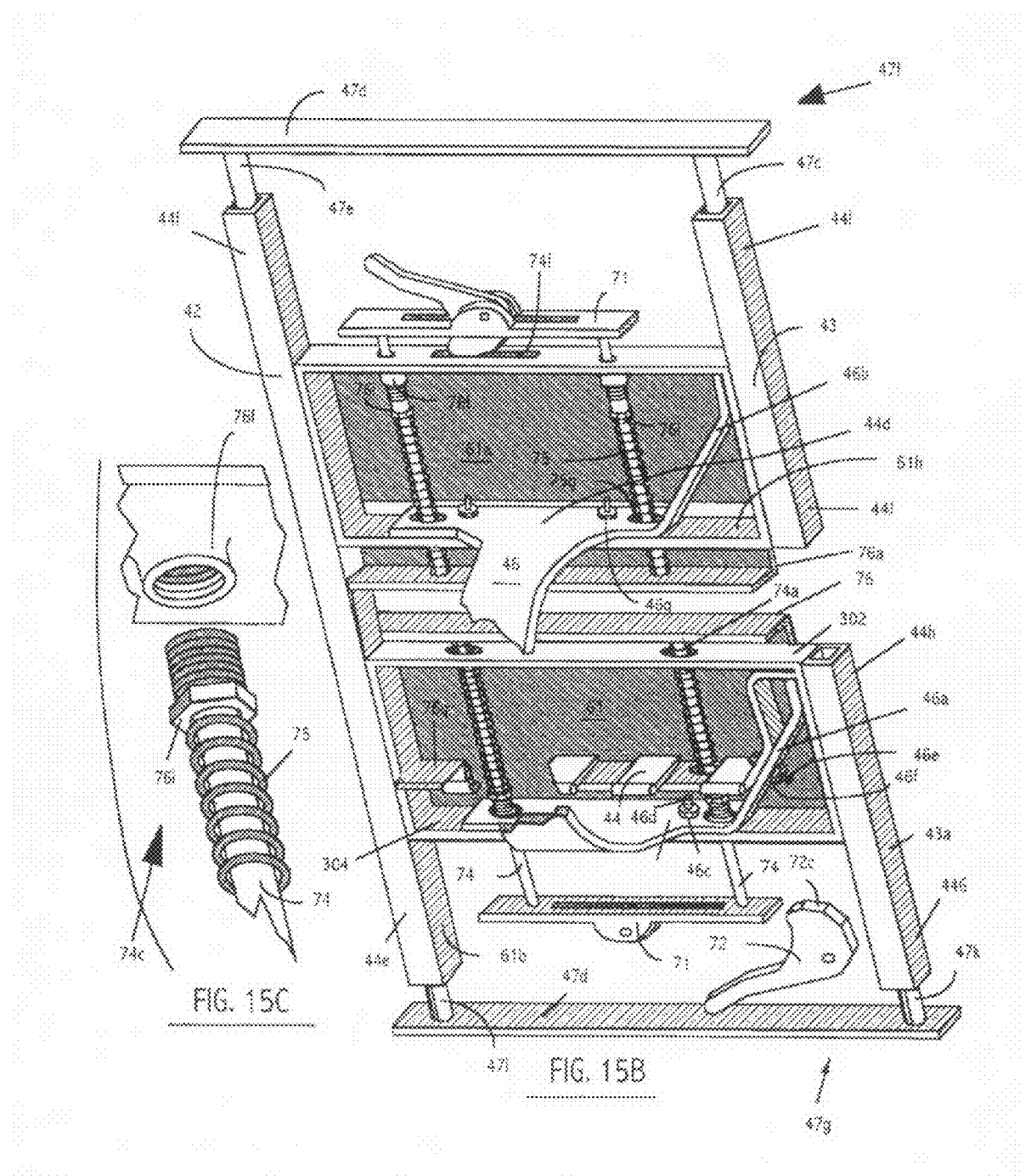

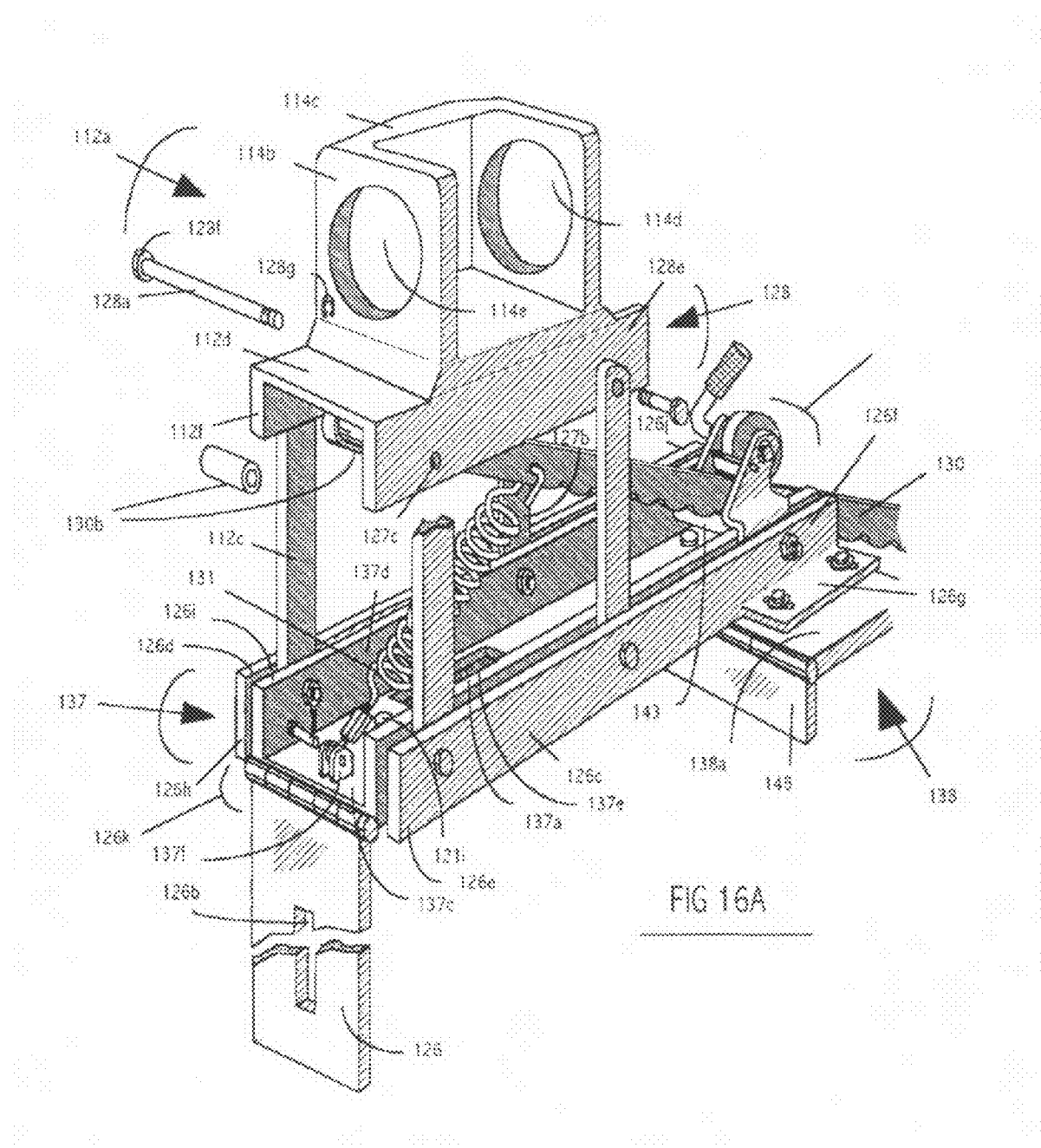

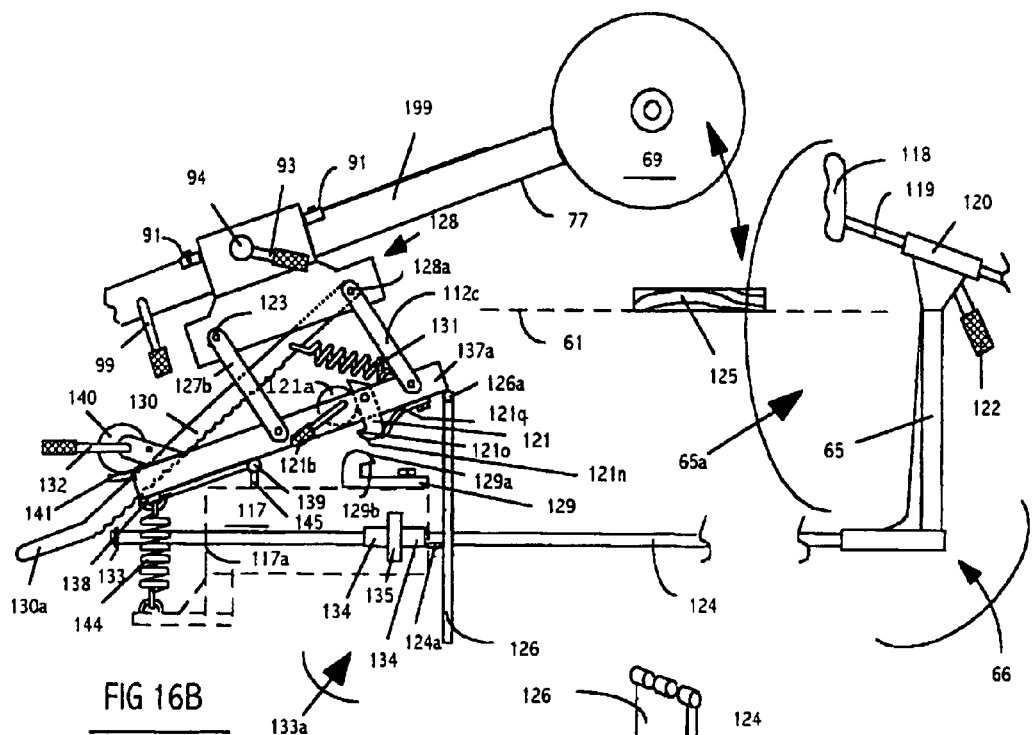
FIG 16B
FIG 16C
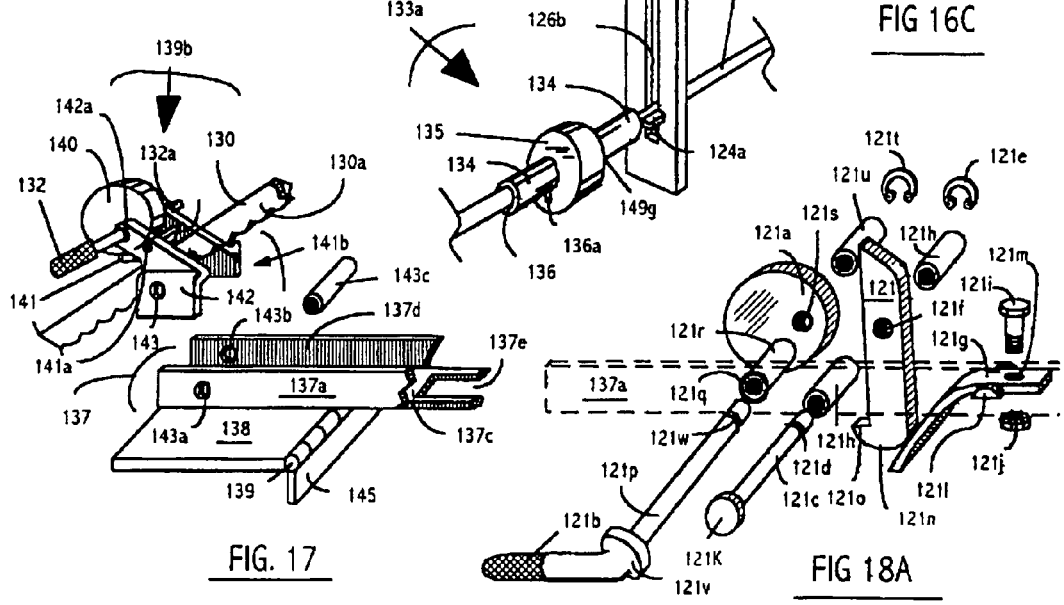
FIG. 17
FIG 18A

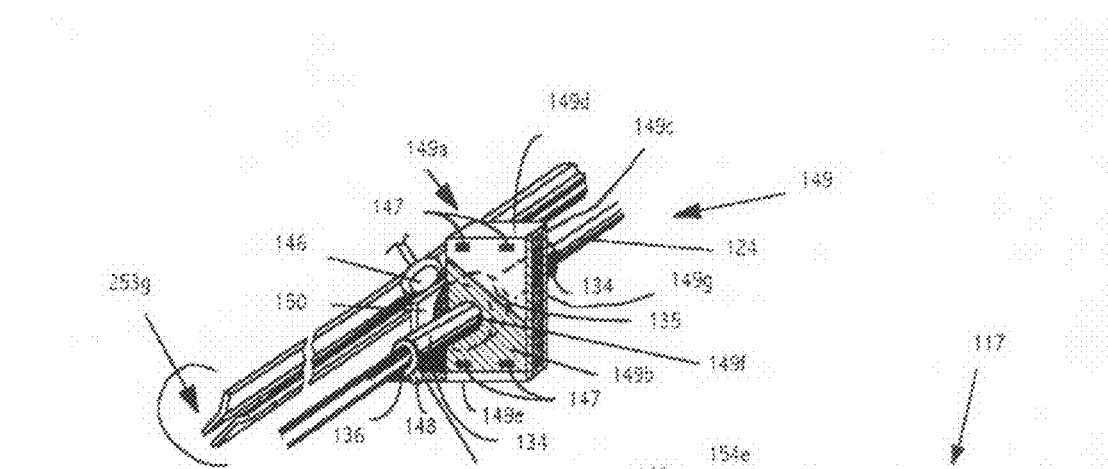
FIG. 19A
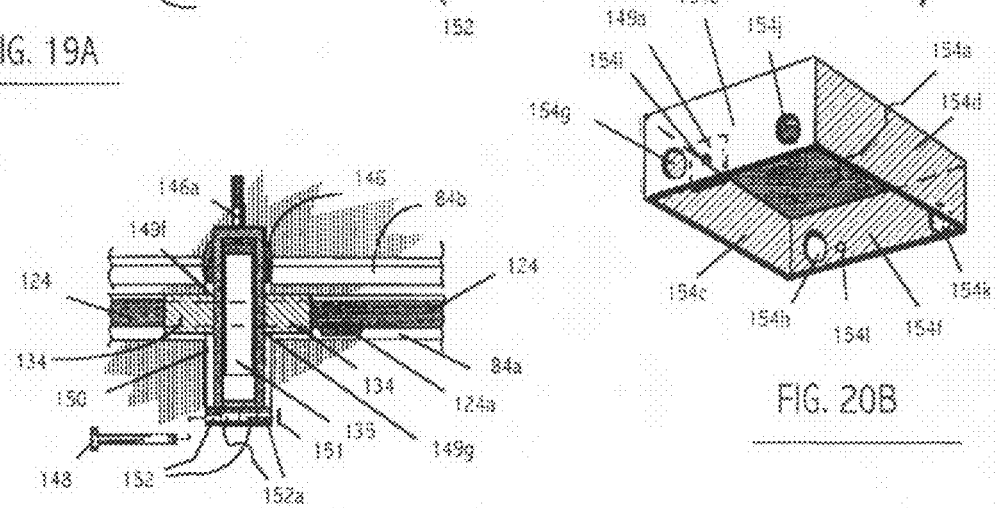
FIG. 20A
FIG. 20B
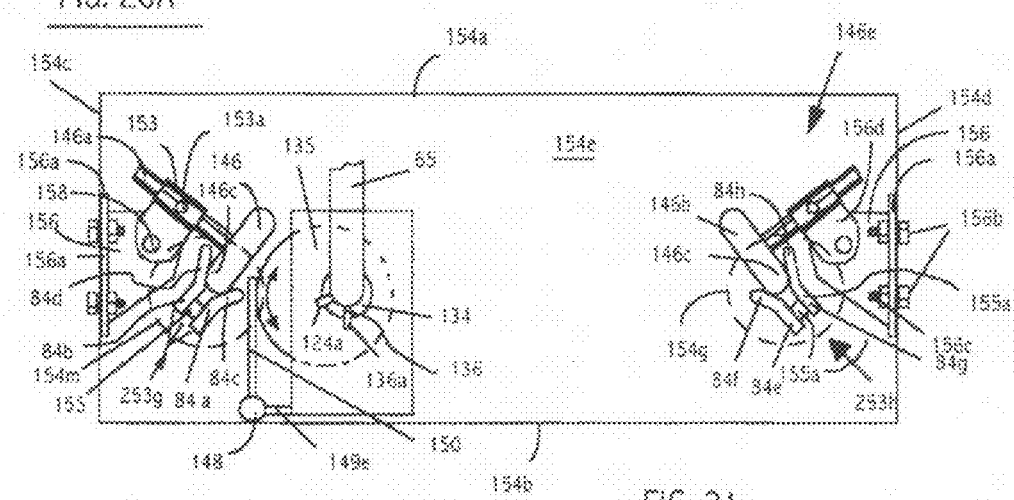
FIG. 21

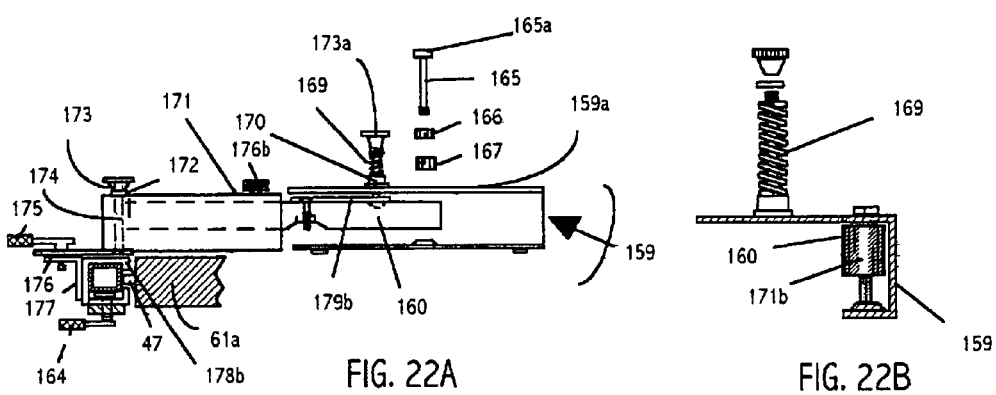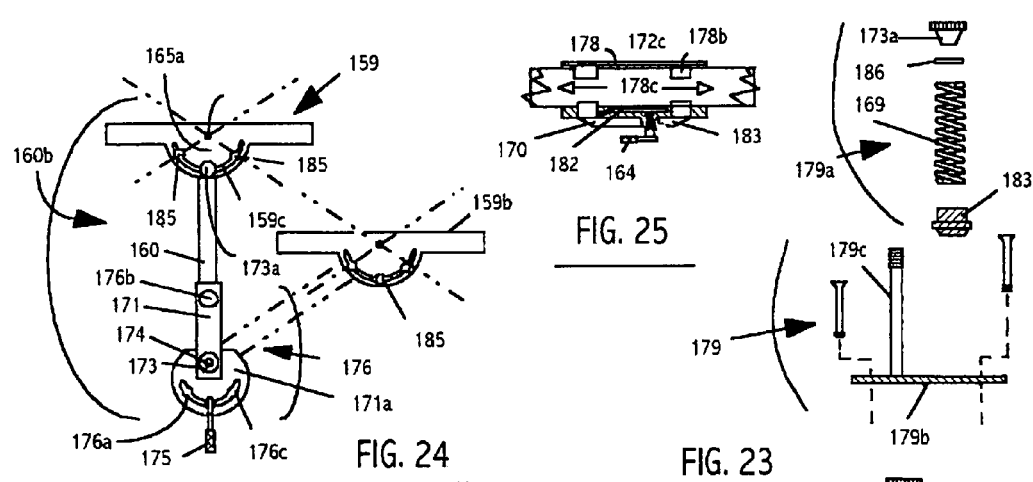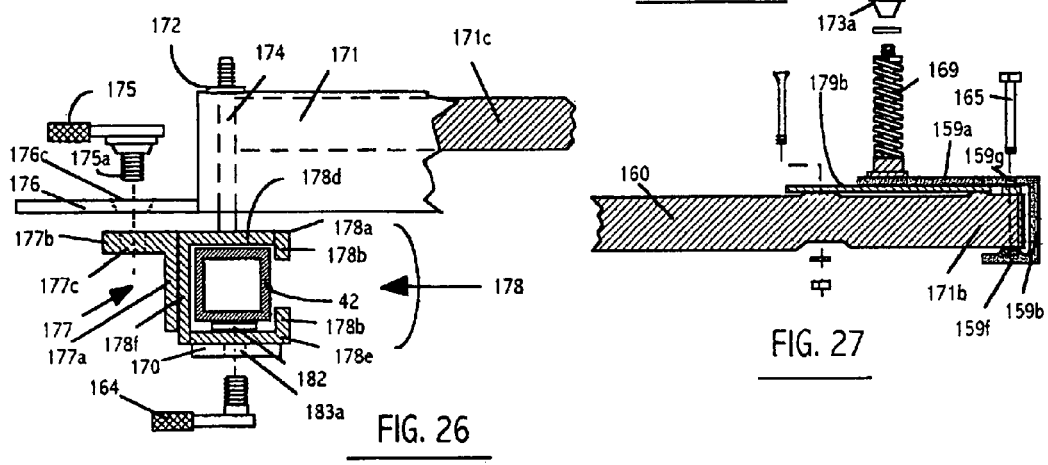

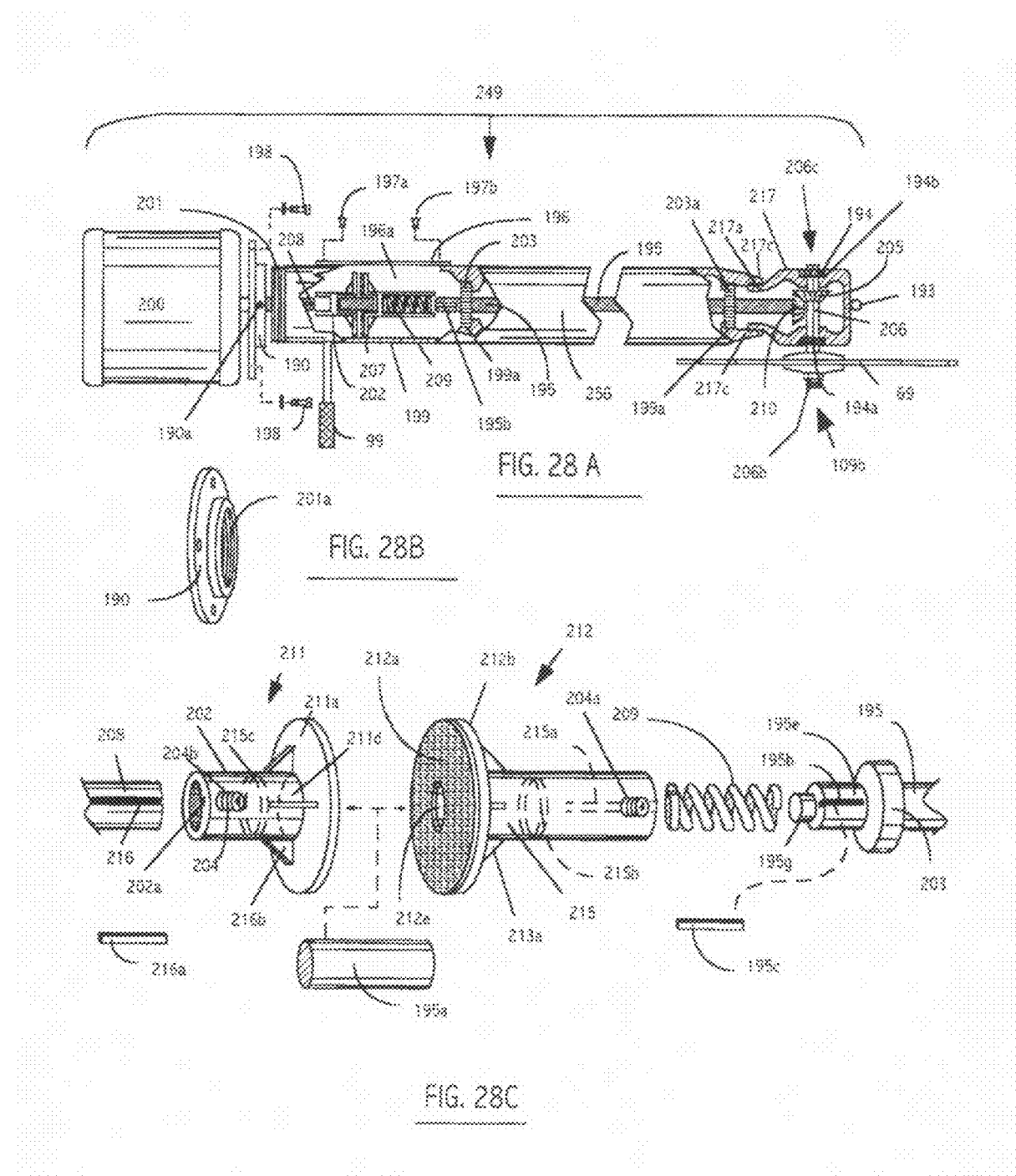

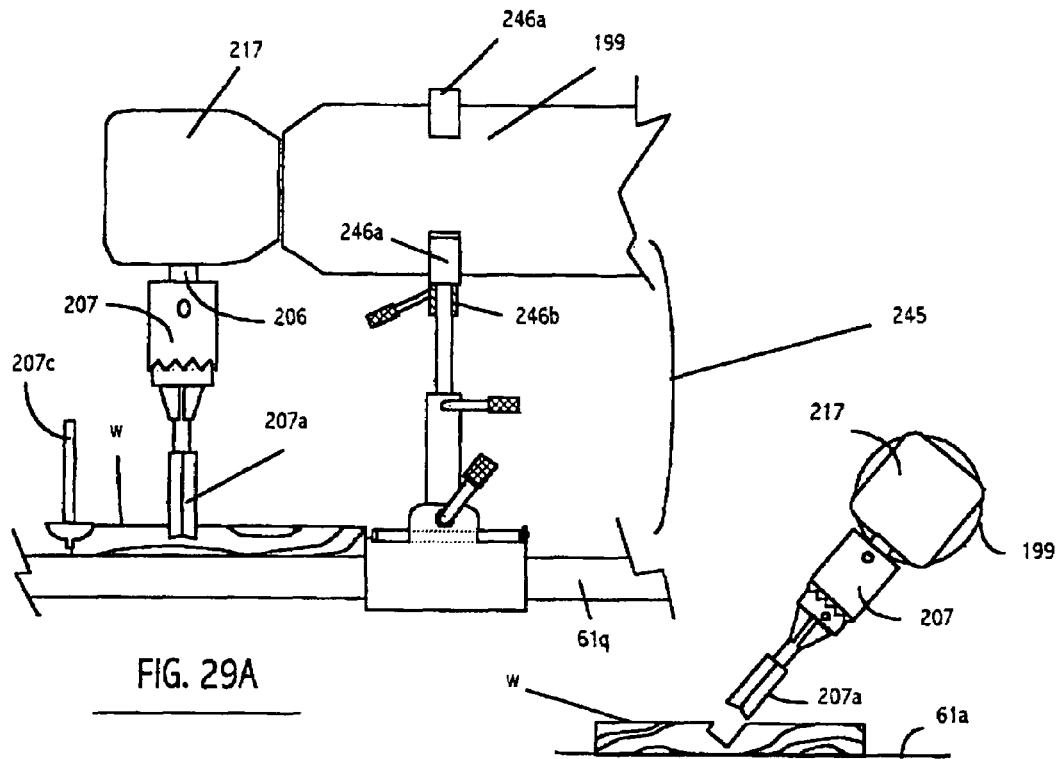
FIG. 29A
FIG. 29C
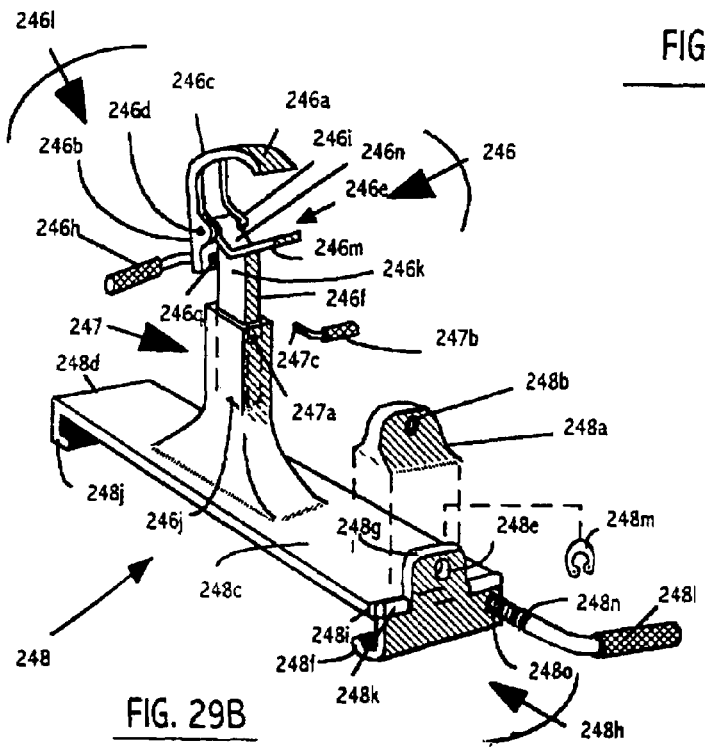
FIG. 29B

CUTTING WORKSTATION RIP FENCE AND MITER GAUGE

CROSS-REFERENCE TO RELATED APPLICATIONS

This application claims the benefit of the prior filed non-provisional application Ser. No. 10/229,846 under the provisions of 35 U.S.C. 121 which in turn claims the benefit of PPA Ser. No. 60/315,860 under the provisions of 35 USC 119(e).

STATEMENT REGARDING FEDERALLY SPONSORED RESEARCH OR DEVELOPMENT

Not applicable

REFERENCE TO MICROFICHE APPENDIX

Not applicable

BACKGROUND

The present invention relates to a materials cutting device. More particularly, a wood cutting device used in the capacity of a shaper or saw. The device performs numerous types of cuts, such as chop cuts, miter cuts, crosscuts and rip cuts, both from above and below the work piece support table.

Various saws currently available are used for performing a variety of operations and several saws combine certain functions. See U.S. Pat. Nos. 5,797,307; 5,768,967; 4,211,134 and 3,465,793. However, in the various permutations, there appears to be a fixed relationship between the cutting blade and the work surface or table or the cutting blade is designed to move primarily relative to the fixed position of the work surface. There is presently no saw known in which the position of the work surface, and consequently, the work piece, and the cutting device can adopt many and varied positions relative to one another. This results in much of the prior art being utilized for limited functions such as cutting as opposed to routing, or chop cutting as opposed to rip cutting. Portability functions are not integral in much of the prior art.

Currently existing saws uniformly exhibit narrow cutter enclosures or inserts. Because of this limitation, these saws are less capable of performing cuts on irregularly shaped work pieces. Cutter inserts are non adjustable and when changing cutters, inserts must also be changed or removed. Adjustments in blade angle and height in the prior art is usually accomplished by a sometimes laborious and time-consuming hand cranking. In those existing saws where the motor is close to the cutter, moving the cutter also requires moving a bulky motor past the work piece.

OBJECTS AND ADVANTAGES

An object of this invention is to provide multiple cutting functions and complete versatility regarding the way the cutter can act upon a workpiece and complete versatility regarding the angle the workpiece can adopt, through the adjustability of the machine, in relation to the cutter. Because of its mobile, yet substantial base and carriage, the benefits of many different cutting functions may be easily transported to the job site yet have the stability of the stationary machines seen in a standard workshop. The device is stable on its own frame without the necessity of a separate work platform.

Another objective of the present invention is to provide a broad range of configurations of the work surface and the cutting apparatus relative to one another. Just as the cutter may be positioned above or below the work surface and consequently above or below the work piece, the work surface is also adjustable and may be raised either lower or higher in relationship to the cutter. In addition, the work surface may be tilted from the horizontal resulting in miter cuts of varying degrees being performed on the work piece. The cutter arm and consequently the cutter may be moved back and forth in relation to the work surface and, in addition, is rotatable through 360 degrees along its long axis. This coupled with the fact the work surface may also be tilted, results in a miter cuts through a large range of angles. Thus, this device allows an unlimited number of positional permutations to be achieved.

The miter gauge and the variable opening between the left and right work surface components allow the work piece to be placed and supported in large number of positions. A corollary to the ability to place the work piece in a number of positions is the ability for the invention to accommodate work pieces with a large variety of shapes. Because of this feature, the device has application in a production settings where it might be more efficient to pre-assemble components and then subject the component to certain milling operations. The pre-assembled components could have irregular shapes this device could accommodate. The distance between the left and right work surfaces have an added advantage of accommodating cutters of various sizes and configurations.

The cutter can also be rotated to and fixed in a position parallel to the worktable allowing the work piece to be laid flat on the work surface. This would allow the routing or cutting of the edges of the work piece. The cutting arm can be moved downward into the work piece facilitating a chop cut. The arm, if kept on the horizontal, can be moved through the work piece by riding forward and backward on rails allowing the blade to move horizontally through the workpiece for cross cuts. The table elevation assembly associated with the work surface is also capable of adjusting its position relative to the work piece from both above and below allowing a depth of cut adjustment. The broad range of adjustability of the device components along with the ability to position the work piece in a number of ways provides maximum flexibility and utility.

In addition to the adjustability of the device, another object of the invention is to allow the operation and adjustments quickly, safely and efficiently from a front-mounted control handle. Table tilt and height are controlled though mechanisms that initially allow quick adjustment without hand cranking. However, after the quick adjustment, this device allows hand cranking to achieve more precise settings if needed. These quick adjust mechanisms utilize threaded drives which benefit from a mechanism to both lubricate and clean the threads of dust and debris as adjustments are made thereby avoiding wear and extending the life of the adjustment components.

Utilization of a direct shaft drive connecting the motor to the cutter allows better power transfer, requires less space than standard belt drives and dramatically reduces vibration associated with belt drive mechanisms. Further, using a shaft allows the motor to be positioned along the same axis of the shaft itself avoiding using additional gears. Using a shaft with the motor position along its axis also allows the shaft to be rotated 360 degrees allowing the cutter to adopt almost any orientation relative to the work piece.

The combination rip face and miter gauge is integral in maintaining work piece positioning yet allowing a variety of work piece positions to be achieved.

These and other objects of the invention will be apparent to those skilled in is art from the following detailed description of the preferred embodiment of the invention.

BRIEF DESCRIPTION OF SEVERAL VIEWS OF DRAWING

FIG. 1D is a perspective view of the cutter arm assembly.

FIG. 1E is a perspective view of the work surface platform.

FIG. 1G is a perspective view of the cutter arm positioning assembly.

FIG. 1F is a perspective view of the work surface positioning assembly.

FIG. 1H is a perspective view of the workstation base frame.

FIG. 2B is a left elevation view of the work surface positioning assembly in an expanded position.

FIG. 3 is a perspective view of the left fine adjuster strut.

FIG. 4 is a perspective of the height adjuster universal block and height adjuster universal mounting block bracket.

FIG. 5 is an elevation cross section of the work surface height adjuster and the work surface angle adjuster.

FIG. 6A is a perspective view of the height adjuster universal block.

FIG. 6B is a perspective view of the angle adjuster universal mounting block bracket.

FIG. 7 is a perspective view of the height quick adjust block and the height quick adjust block-mounting bracket.

FIG. 9C is a right side perspective of the height adjuster frame.

FIG. 12 is a top plan view showing the relationship of the cutting head and the work surface platform.

FIG. 13 is a partial cross section view of the cutter arm lock.

FIG. 15B is a perspective view of the undersurface of the work surface assemblies showing the work surface connector.

FIG. 15C is a perspective view of the insert adjusting means.

FIG. 16A is a right elevation view of the elevation and chop cut carriage.

FIG. 16B is a left elevation view of the elevation and chop cut carriage in relation to the carriage and control assembly.

FIG. 16C is a perspective view of the chop cut activating hinge.

FIG. 17 is a perspective view of the carriage elevation locking assembly.

FIG. 18A is a perspective view of the catch means.

FIG. 19A is a perspective view of the carriage lock cam housing.

FIG. 20A is a right elevation view of the cam lobe housing.

FIG. 20B is a perspective view of the carriage lock housing.

FIG. 21 is a front elevation view of the carriage lock housing in relation to workstation base frame rails.

FIG. 22A is an elevation view of the rip fence and miter gauge.

FIG. 22B is an elevation view of the fence.

FIG. 23 is an elevation view of the pin plate and set screw assembly.

FIG. 24 is top plan view of the combination rip fence and miter gauge.

FIG. 25 is an elevation view of the rip fence and miter gauge mounting bracket.

FIG. 26 is a cross-section view of the rip fence miter gauge mounting bracket.

FIG. 27 is an elevation view of the rip fence.

FIG. 28A is a partial cross-sectional plan view showing the cutter arm assembly.

FIG. 28B is a perspective view of the motor mounting plate.

FIG. 28C is a perspective view of the first and second clutch plates.

FIG. 29A is a side elevation view of the cutter arm and cutter arm gear case with a chuck and router bit installed held by the arm clamp.

FIG. 29B is a perspective view of the arm clamp.

FIG. 29C is an elevation view of the router bit, chuck and gear case oriented for routing at an angle.

Figure 1A:
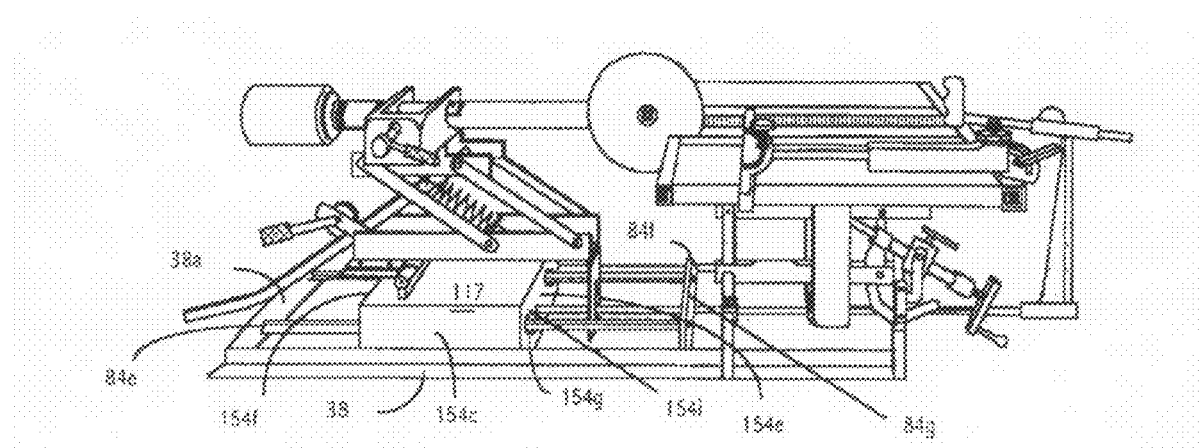
FIG. 1A is a perspective view of the cutting workstation.

| TABLE OF REFERENCE NUMERALS | |
|---|---|
| work surface angle adjuster | 9 |
| first friction feet | 10 |
| work surface height adjuster | 11 |
| wheels | 12a |
| leg assembly | 13 |
| first leg mounting plate | 13a |
| axial component | 13b |
| first leg mounting plate detent | 13c |
| second leg mounting plate | 13d |
| bolts | 13e |
| vertical leg struts | 13e |
| second leg mounting plate detent | 13f |
| base leg component | 13g |
| second long strut | 14 |
| first long strut | 14a |
| axle | 15 |
| wheel assembly | 15a |
| lower mobile base frame | 16 |
| short strut | 16a |
| lower frame transverse member | 16b |
| lower frame first longitudinal member | 16c |
| lower frame second longitudinal member | 16d |
| leg mounting strut | 17a |
| handles | 18 |
| upper mobile base frame | 19 |
| third transverse member | 19a |
| upper frame second transverse member | 19b |

-continued

TABLE OF REFERENCE NUMERALS

| | |
|---|---|
| upper frame first longitudinal member | 19c |
| upper frame second longitudinal member | 19d |
| upper frame first transverse member | 19e |
| base support | 20 |
| base support circular apertures | 20a |
| left fine adjuster strut | 24 |
| first vertical strut component | 24a |
| second vertical strut component | 24b |
| adjuster strut base | 24c |
| horizontal face | 24d |
| vertical face | 24e |
| lateral adjust apertures | 24f |
| right fine adjuster strut | 24g |
| vertical adjustment bolt | 25 |
| vertical adjustment locknut | 26 |
| cranking handle | 27 |
| left table elevation lever | 28 |
| left handle attachment end | 28a |
| right handle attachment end | 28b |
| right table elevation lever | 28c |
| outer left bracket member | 29 |
| inner left bracket member | 29a |
| inner right bracket member | 29b |
| outer right bracket member | 29c |
| left lower positioning assembly bracket | 29d |
| right lower positioning assembly bracket | 29e |
| height mounting first strut | 30 |
| height mounting second strut | 30a |
| bolt | 30b |
| height quick adjust block mounting bracket | 30c |
| partially threaded pins | 31 |
| lock washer | 31a |
| first strut aperture | 31b |
| spacer | 31c |
| height adjuster central rod | 32 |
| second cap sealing washer | 32a |
| second cap dust wiping washer | 32b |
| first cap sealing washer | 32d |
| first cap dust wiping washer | 32e |
| height adjuster central rod first end | 32f |
| height adjuster central rod second end | 32g |
| adjuster strut pivoting fastener | 33 |
| second vertical strut component aperture | 33a |
| pivoting fastener | 33b |
| fastener | 33c |
| first vertical strut component aperture | 33d |
| pivoting fastener | 33e |
| height adjuster first cap | 34 |
| first cap top | 34b |
| height adjuster second cap | 34c |
| second cap annular body | 34d |
| second cap top | 34e |
| first cap internally threaded aperture | 34f |
| height adjuster annular section | 35 |
| height adjuster annular section second end | 35a |
| height adjuster annular section first end | 35b |
| height adjust block set handle | 36 |
| pad | 36a |
| internally threaded top surface aperture | 36b |
| height quick adjust block | 37 |
| height adjust quick block smooth bore aperture | 37a |
| height adjust quick block smooth bore aperture | 37b |
| left horizontal member | 39 |
| right horizontal member | 39a |
| right horizontal member threaded aperture | 39b |
| angled flange | 39c |
| right adjuster strut | 39d |
| left adjuster strut | 40 |
| table elevation assembly | 41 |
| front rail | 42 |
| front rail front face | 42a |
| front rail screws | 42b |
| second rear rail | 43 |
| first rear rail | 43a |
| hinge assembly | 44 |
| work surface hinge components | 44a |
| left horizontal member hinge components | 44b |

-continued

TABLE OF REFERENCE NUMERALS

| | |
|---|---|
| work surface connector first end | 44c |
| work surface connector second end | 44d |
| annular front rail first end | 44e |
| annular front rail second end | 44f |
| first rear rail first end | 44g |
| first rear rail second end | 44h |
| second rear rail first end | 44i |
| second real rail second end | 44j |
| pivoting fastener | 45 |
| pivoting fastener | 45a |
| work surface connector | 46 |
| work surface connector first strut | 46a |
| work surface connector second strut | 46b |
| first connector end | 46h |
| second connector end | 46i |
| front rail spacer | 47 |
| spacer aperture | 47a |
| first bar first tube | 47c |
| first bar | 47d |
| first bar second tube | 47e |
| second lateral work surface extension | 47f |
| first lateral work surface extension | 47g |
| bar | 47h |
| tube | 47i |
| tube | 47k |
| central rod snap rings | 48 |
| circumferential grooves | 48a |
| adjuster strut bolts | 49 |
| adjuster strut nuts | 49a |
| vertical adjust apertures | 50 |
| internally threaded hinge box aperture | 51 |
| internally threaded hinge box aperture | 51b |
| first threaded pin | 52 |
| second threaded pin | 52a |
| spacer | 53 |
| fasteners | 55 |
| horizontal member hinge pin | 56 |
| head | 56a |
| face frame | 57 |
| hinge box | 58 |
| hinge box mounting plate | 58a |
| angle adjuster universal block | 58b |
| height adjuster universal block | 59 |
| height adjuster universal block first smooth bore | 59a |
| height adjuster universal block second smooth bore | 59b |
| joint block | 59c |
| smooth bore aperture | 59d |
| horizontal hinge pin snap ring | 60 |
| annular groove | 60a |
| first work surface | 61 |
| second work surface | 61a |
| first side panel | 61e |
| second work surface assembly front panel | 61f |
| second work surface assembly rear panel | 61g |
| second work surface inner panel | 61h |
| quick adjust block central bore | 62 |
| handle bar | 64 |
| control handle stem | 65 |
| control rod handle | 65a |
| control | 66 |
| slotted brace | 67 |
| slotted brace bracket | 67a |
| aperture | 67b |
| aperture | 67c |
| slotted brace bracket bolt | 68 |
| washer | 68a |
| nut | 68b |
| cutter | 69 |
| slotted brace knob | 70 |
| slotted brace washer | 70a |
| first adjusting handle bracket | 71 |
| first adjusting handle longitudinal slot | 71b |
| adjuster handle | 72 |
| handle portion | 72a |
| curved face portion | 72b |
| faceted face | 72c |
| lever mounting brackets | 72d |

-continued

TABLE OF REFERENCE NUMERALS

| | |
|---|---|
| lever mounting bracket pin | 73 |
| insert adjusting rods | 74 |
| insert adjusting rod second end | 74a |
| front rail perforations | 74b |
| insert adjusting means | 74c |
| insert adjusting rod first end | 74d |
| stop | 74e |
| groove | 74f |
| work surface aperture | 74g |
| adjusting rod compression springs | 75 |
| apertures | 75a |
| aperture | 75b |
| work surface perforations | 75g |
| first work surface insert | 76 |
| second work surface insert | 76a |
| vertical first work surface insert component | 76b |
| first work surface insert horizontal component | 76c |
| vertical component | 76d |
| interior surface | 76e |
| spring adjuster seat | 76f |
| horizontal component | 76g |
| spring adjuster | 76i |
| hinge mounting bracket | 76q |
| apertures | 76t |
| rear face perforations | 76u |
| cutter arm extension | 77 |
| stop arm threaded knob | 78 |
| rocker assembly stop arm | 79 |
| slide bracket slot | 79a |
| stop arm retention washer | 79b |
| stop angle adjust assembly | 79c |
| stop arm aperture | 79c |
| cut out | 79c |
| work surface connector stops | 80 |
| slide bracket | 81 |
| retention flanges | 81a |
| rocker handle | 82 |
| rails | 84 |
| first rail lower component | 84a |
| first rail upper component | 84b |
| first rail lower component lip | 84c |
| first rail upper component lip | 84d |
| distal end | 84e |
| second rail lower component | 84e |
| proximal end | 84f |
| second rail lower component lip | 84f |
| second rail upper component | 84g |
| transverse rail support | 84g |
| second rail upper component lip | 84h |
| rocker bracket | 85 |
| rocker bracket first flange | 85a |
| rocker bracket second flange | 85b |
| threaded sleeve | 87 |
| rod | 88 |
| bearing enclosure | 89 |
| cutter arm | 90 |
| cutter arm setscrew | 90a |
| collar positioning tabs | 91 |
| collar positioning set screws | 91a |
| collar positioning tab openings | 91b |
| collar positioning tab first aperture | 91e |
| collar positioning tab second aperture | 91f |
| cutter arm lock shoe | 92 |
| brake | 92a |
| shoe setting cap handle | 93 |
| central rod knob | 94 |
| shoe setting cap | 95 |
| internally threaded shoe setting cap aperture | 95a |
| shoe setting cap first end | 95b |
| shoe setting cap second end | 95c |
| shoe setting cap central bore | 95d |
| plate | 96 |
| plate set screw | 96a |
| plate set screw aperture | 96b |
| drive belt | 97 |
| first pulley | 98 |
| arm rotating lever | 99 |

-continued

TABLE OF REFERENCE NUMERALS

| | |
|---|---|
| motor mount | 100 |
| belt drive motor | 101 |
| motor mount annular shaft | 101a |
| plate annular aperture | 101b |
| shoe setting spring | 102 |
| cutter arm lock central rod | 103 |
| cutter arm lock central rod first end | 103a |
| cutter arm lock central rod second end | 103b |
| cutter arm lock shoe neck | 104 |
| shoe setting neck aperture | 104a |
| central rod stop | 105 |
| shoe setting cap tube | 106 |
| shoe setting tube snap ring grooves | 106a |
| cutter arm lock | 107 |
| rotational positioning means | 107a |
| axle | 108 |
| axle first end | 108a |
| axle second end | 108b |
| second pulley | 109 |
| annular flange | 109a |
| arbor | 109b |
| washer | 110 |
| nut | 111 |
| external treads | 112 |
| elevation and chop cut carriage | 112a |
| carriage struts | 112c |
| carriage upper platform base | 112d |
| carriage upper platform second sidewall | 112f |
| bearings sets | 113 |
| central apertures | 113a |
| collar | 114 |
| collar first leg | 114a |
| collar second leg | 114b |
| transverse collar section | 114c |
| collar first bore | 114d |
| collar second bore | 114e |
| circular collar second bore | 114e |
| transverse collar section aperture | 114f |
| transverse collar section first end | 114g |
| transverse collar section second end | 114h |
| shoe setting tube snap rings | 115 |
| clutch and primary shaft enclosure smooth bores | 116 |
| shoe setting means | 116a |
| carriage lock housing | 117 |
| carriage central handle | 118 |
| handle rod | 119 |
| control handle sleeve | 120 |
| catch means | 120a |
| first catch | 121 |
| offset catch cam | 121a |
| catch handle | 121b |
| first catch pin | 121c |
| first pin annular groove | 121d |
| first catch pin snap ring | 121e |
| first catch aperture | 121f |
| leaf spring | 121g |
| second catch spacer | 121h |
| leaf spring bolt | 121i |
| leaf spring nut | 121j |
| first catch pin head | 121k |
| half moon tabs | 121l |
| leaf spring aperture | 121m |
| first catch curved face | 121n |
| first catch tooth | 121o |
| second catch pin | 121p |
| third catch spacer | 121r |
| offset catch cam aperture | 121s |
| first catch pin snap ring | 121t |
| first catch spacer | 121u |
| retaining flange | 121v |
| annular groove | 121w |
| handle rod set | 122 |
| pin | 123 |
| control rod | 124 |
| control rod tab | 124a |
| second control rod end | 124b |
| first control rod end | 124c |

-continued

TABLE OF REFERENCE NUMERALS

| Name | Number |
|---|---|
| chop cut activating hinge | 126 |
| chop cut activating hinge pin | 126a |
| chop cut activating hinge slot | 126b |
| lower platform first support | 126c |
| lower platform second support | 126d |
| lower platform first support first end | 126e |
| lower platform first support second end | 126f |
| first platform first support mounting flange | 126g |
| second platform support first end | 126h |
| second platform support second end | 126i |
| second platform support mounting flange | 126j |
| lower carriage platform first end | 126j |
| carriage roller platform second end | 126k |
| struts | 127a |
| struts | 127a |
| sleeves | 127b |
| upper aperture | 127c |
| carriage upper platform | 128 |
| pin | 128a |
| carriage upper platform first sidewall | 128e |
| sidewall | 128e |
| head | 128f |
| snap ring | 128g |
| annular groove | 128h |
| second catch | 129 |
| second catch curved face | 129a |
| second catch tooth | 129b |
| serrated arm | 130 |
| serration | 130a |
| serrated arm tension spring | 131 |
| cam lobe axle handle | 132 |
| cam lobe axle | 132a |
| control rod stop | 133 |
| offset cam | 133a |
| cam sleeve | 134 |
| carriage locking offset cam lobe | 135 |
| cam sleeve slot | 136 |
| cam lobe slot | 136a |
| carriage lower platform | 137 |
| carriage lower platform first sidewall | 137a |
| carriage lower platform base | 137c |
| carriage lower platform second side wall | 137d |
| catch opening | 137e |
| spring attachment bracket | 137f |
| base hinge | 138 |
| horizontal base hinge component | 138a |
| base hinge pin | 139 |
| carriage elevation locking assembly | 139b |
| offset cam lobe | 140 |
| carriage elevation locking shoe | 141 |
| elongated tabs | 141a |
| offset cam bracket | 141b |
| first offset cam support | 142 |
| apertures | 142a |
| second offset cam support | 142c |
| serrated arm catch | 143 |
| catch | 143c |
| tension spring | 144 |
| vertical base hinge component | 145 |
| carriage wheel | 146 |
| carriage wheel axle | 146a |
| carriage wheel edge | 146b |
| carriage wheel edge | 146c |
| carriage lock wheels | 146e |
| bearing | 146f |
| rim | 146g |
| stop plate hinge pin | 148 |
| carriage lock assembly | 149 |
| carriage lock cam housing | 149a |
| first cam housing sidewall | 149b |
| second cam housing sidewall | 149c |
| cam housing top | 149d |
| cam housing bottom | 149e |
| first sidewall cam aperture | 149f |
| second sidewall cam aperture | 149g |
| cam housing bottom lip | 149h |
| stop plate | 150 |
| snap ring | 151 |
| annular groove | 151a |
| hinge lip | 152 |
| sleeve bracket | 153 |
| set screw | 153a |
| carriage lock housing top | 154a |
| carriage lock housing left sidewall | 154c |
| carriage lock housing right side wall | 154d |
| carriage lock housing front | 154e |
| carriage lock housing back | 154f |
| left rail front aperture | 154g |
| left rail back aperture | 154h |
| front rod aperture | 154i |
| right rail front aperture | 154j |
| right rail back aperture | 154k |
| back rod aperture | 154l |
| left front rail aperture | 154m |
| first rail spacers | 155 |
| second rail spacers | 155a |
| wheel mounting bracket | 156 |
| mounting plate | 156a |
| fastener | 158 |
| fence | 159 |
| semicircular fence component | 159a |
| straight edge component | 159b |
| fence semicircular slot | 159c |
| internally threaded aperture | 159d |
| fence under lip | 159e |
| second fence surface | 159f |
| third fence surface | 159g |
| extension arm | 160 |
| aperture | 160a |
| rip fence and miter gauge | 160b |
| fence position fixing means | 160c |
| bridge set screw | 164 |
| fence pin | 165 |
| head | 165a |
| externally threaded end | 165b |
| bushing | 166 |
| bushing | 167 |
| internally threaded knob | 168 |
| vertical pin spring | 169 |
| mounting bracket bridge | 170 |
| base arm | 171 |
| base arm adjusting plate | 171a |
| distal extension arm end | 171b |
| proximal extension arm end | 171c |
| washer | 172 |
| slot | 172b |
| base arm threaded knob | 173 |
| arm pin | 174 |
| set screw | 175 |
| mounting bracket bolt | 175a |
| adjustable base | 176 |
| semicircular slot | 176a |
| adjustment plate set screw seats | 176c |
| angle bracket | 177 |
| a vertical angle bracket component | 177a |
| horizontal angle bracket component | 177b |
| horizontal angel bracket internally threaded aperture | 177c |
| rip fence and miter gauge mounting bracket | 178 |
| sliding bracket | 178a |
| mounting bracket tabs | 178b |
| slot | 178c |
| first horizontal mounting bracket component | 178d |
| second horizontal mounting bracket component | 178e |
| vertical mounting bracket component | 178f |
| pin plate | 179 |
| set screw assembly | 179a |
| horizontal pin plate component | 179b |
| vertical pin | 179c |
| bridge pressure spring | 182 |
| pressure bushing | 183 |
| second horizontal mounting bracket internally threaded aperture | 183a |
| aperture | 183b |
| fence component circular pressure bushing seats | 185 |

TABLE OF REFERENCE NUMERALS-continued

| Name | Number |
|---|---|
| spring washer | 186 |
| washer | 187 |
| nut | 188 |
| first spring base washer | 189a |
| second spring base washer | 189b |
| motor mounting plate | 190 |
| motor mounting plate setscrew | 190a |
| gear case nipple | 193 |
| secondary shaft first bearing | 194 |
| secondary shaft second bearing | 194a |
| gear case bearing seats | 194b |
| gear case bore | 194c |
| gear case bore | 194d |
| primary shaft | 195 |
| clutch plate alignment pin | 195a |
| longitudinal primary shaft slot | 195b |
| primary shaft slot | 195b |
| second key | 195c |
| cutter drive assembly | 195d |
| primary shaft first end | 195e |
| primary shaft second end | 195f |
| positioning rod | 195g |
| cover plate | 196 |
| clutch access opening | 196a |
| bolt | 197a |
| bolt | 197b |
| motor mounting plate bolts | 198 |
| clutch and primary shaft enclosure | 199 |
| clutch enclosure bearing seats | 199a |
| motor | 200 |
| clutch and primary shaft enclosure first end | 201 |
| motor mounting plate central aperture | 201a |
| mounting corresponding bracket | 201b |
| first annular sleeve | 202 |
| first annular sleeve slot | 202a |
| primary shaft first bearing | 203 |
| primary shaft second bearing | 203a |
| first clutch plate setscrew | 204 |
| second annular sleeve aperture | 204a |
| first annular sleeve aperture | 204b |
| second clutch plate setscrew | 204c |
| second beveled gear | 205 |
| secondary shaft | 206 |
| secondary shaft first end | 206b |
| secondary shaft second end | 206c |
| routing chuck | 207 |
| straight router bit | 207a |
| cove bit | 207c |
| motor shaft | 208 |
| cutter drive shaft spring | 209 |
| first beveled gear | 210 |
| bearing with lubricant seal | 210a |
| first clutch plate | 211 |
| first clutch disk | 211a |
| first clutch disk central opening | 211d |
| second clutch plate | 212 |
| clutch plate friction inducing surface | 212a |
| second clutch disk | 212b |
| second clutch disk central opening | 212e |
| second clutch disk supports | 213a |
| second annular sleeve | 215 |
| second annular sleeve slot | 215a |
| second annular sleeve internal stop | 215b |
| first annular sleeve internal stop | 215c |
| longitudinal motor shaft slot | 216 |
| first key | 216a |
| first clutch plate supports | 216b |
| gear case | 217 |
| gear case neck | 217a |
| internal threads | 217b |
| clutch and primary shaft enclosure second end | 217c |
| height adjuster universal mounting bracket | 240 |
| angle block partially threaded pin | 240a |
| angle block partially threaded pin | 240b |
| angle strut internally threaded apertures | 240c |
| angle block mounting bracket first strut | 240d |
| angle adjuster universal block mounting plate | 240e |
| angle block mounting bracket second strut | 240f |
| angle adjuster mount | 241b |
| cutter stabilization clamp | 245 |
| arm clamp | 246 |
| jaw hooking end | 246a |
| jaw adjusting end | 246b |
| clamping jaw | 246c |
| clamping arm hinge pin | 246d |
| cutter arm anvil | 246e |
| arm clamp shaft | 246f |
| clamping bracket adjusting handle | 246h |
| hinge flanges | 246i |
| arm clamp shaft first end | 246j |
| arm clamp shaft second end | 246k |
| arm clamping bracket | 246l |
| cutter arm anvil first end | 246m |
| cutter arm anvil second end | 246n |
| jaw adjusting internally threaded aperture | 246q |
| arm clamp base | 247 |
| arm clamp base internally threaded aperture | 247a |
| arm clamp base locking handle | 247b |
| arm clamp base locking handle externally threaded end | 247c |
| table clamp | 248 |
| adjusting block | 248a |
| adjusting block internally threaded aperture | 248b |
| clamping base | 248c |
| clamping base first end | 248d |
| adjusting tab smooth bore | 248e |
| smooth bore aperture | 248e |
| hooking lip | 248f |
| adjusting tab | 248g |
| adjustable hooking bracket | 248h |
| clamping base second end | 248i |
| fixed hooking bracket | 248j |
| second clamping base end hinge | 248k |
| adjuster handle | 248l |
| adjusting block snap ring | 248m |
| snap ring seat | 248n |
| adjuster handle threaded end | 248o |
| cutter arm assembly | 249 |
| work surface platform | 250 |
| cutter arm positioning assembly | 251 |
| work surface positioning assembly | 252 |
| mobile base frame | 253 |
| workstation base frame | 253a |
| work station base first longitudinal member | 253b |
| work station base first transverse rail support | 253c |
| work station base second longitudinal member | 253d |
| work station base transverse member | 253e |
| work station base second transverse rail support | 253f |
| first rail | 253g |
| second rail | 253h |
| mobile base assembly | 254 |
| cutter drive shaft assembly | 255 |
| shaft housing | 256 |
| carriage and control assembly | 257 |
| first work surface assembly | 300 |
| second work surface assembly | 300a |
| first insert adjusting means | 301 |
| second insert adjusting means | 301a |
| first work surface inner panel | 302 |
| first work surface inner panel first end | 302a |
| first work surface inner panel second end | 302b |
| first work surface rear panel | 303 |
| first work surface rear panel first end | 303a |
| first work surface rear panel second end | 303b |
| first work surface outer panel | 304 |
| first work surface front panel | 305 |
| first work surface front panel first end | 305a |
| first work surface front panel second end | 305b |
| first work surface top panel | 306 |
| top panel inner edge | 306c |
| top panel ledge | 306d |
| height adjuster frame | 307 |
| first work surface outer panel first aperture | 307 |
| first work surface outer panel second aperture | 308 |
| first work surface inner panel first aperture | 309 |

-continued

TABLE OF REFERENCE NUMERALS

| first work surface inner panel second aperture | 310 |
| first work surface top panel ledge | 311 |
| height quick adjust block top surface | 325 |

DETAILED DESCRIPTION OF INVENTION

Figure 1B:
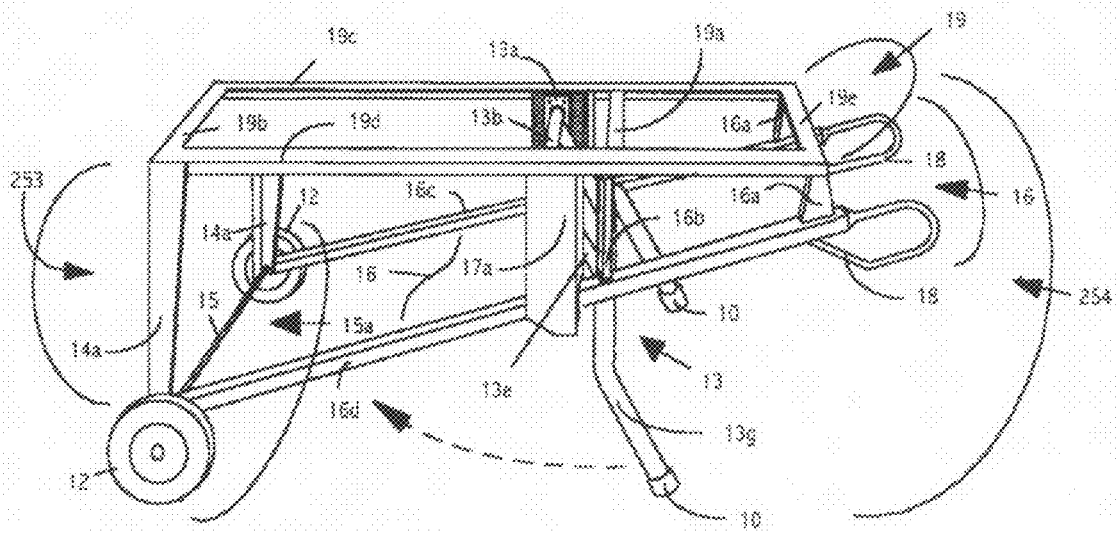
FIG. 1B is a perspective view of the mobile base assembly positioned below the cutting workstation.
Figure 1C:
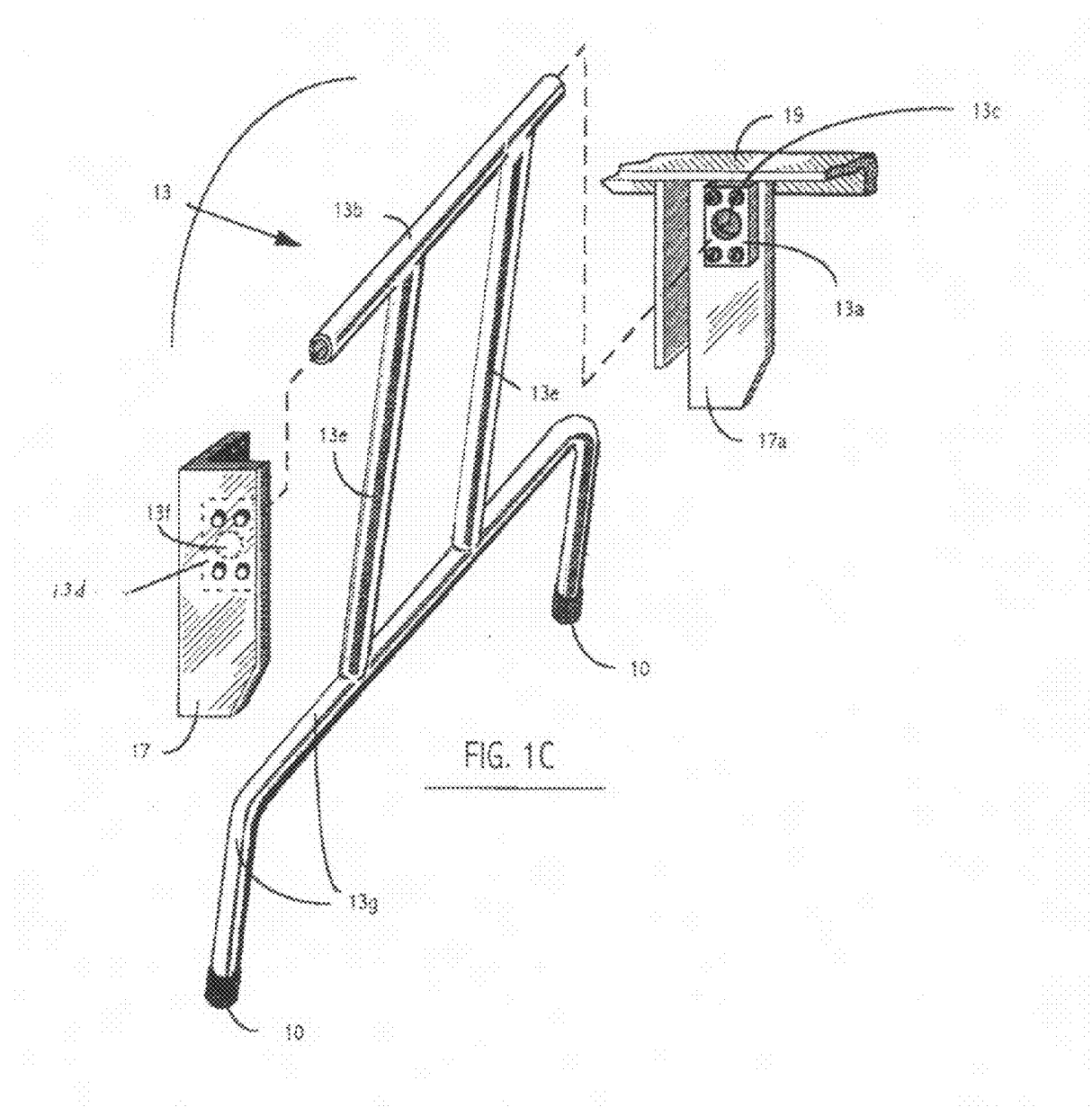
FIG. 1C is a perspective view of the leg assembly.

Turning first to FIG. 1A, the relationship of the various components of the cutting workstation are seen. The cutting work station is composed primarily of metal. FIG. 1B illustrates the mobile base assembly which allows the cutting workstation to be mounted thereon. FIG. 1C illustrates leg assembly 13. Leg assembly 13 is composed of axial component 13b, vertical leg struts 13e, which are connected in turn to base leg component 13g. The ends of base leg component 13g end in friction feet 10. Leg assembly 13 is pivotally mounted to second leg mounting strut 17 and first leg mounting strut 17a. Second leg mounting strut 17 exhibits second leg mounting plate 13d, which further exhibit second leg mounting plate detent 13f. Similarly, first leg mounting strut 17a exhibits first leg mounting plate 13a which also in turn exhibits first leg mounting plate detent 13c. The ends of axial component 13b are disposed within the second leg mounting plate detent 13f and the first leg mounting plate detent 13c allowing the entire leg assembly 13 to pivot therewithin. First leg mounting strut 17a is mounted to upper frame second longitudinal member 19d while second leg mounting strut 17 is mounted to upper frame first longitudinal member 19c. FIG. 1D illustrates the cutter arm assembly 249 which carries the power source, power transmission means to the cutter and the cutter itself is contained. Cutter arm assembly 249 is mounted to cutter arm positioning assembly 251 which is illustrated in FIG. 1G. Cutter arm positioning assembly 251 allows the cutter arm assembly 249 to be raised, lowered, moved forward and rearward, and moved in a chopping action. Cutter arm positioning assembly 251 along with cutter arm assembly 249 is mounted to workstation base frame 253a which is illustrated in FIG. 1H. The cutter arm positioning assembly 251 is moved forward and rearward, along the workstation base frame 253a. FIG. 1F illustrates worksurface positioning assembly 252 which is adjustably mounted to the workstation base frame 253a. Work surface platform 250 is adjustably mounted to the worksurface positioning assembly 252. The worksurface positioning assembly 252 allows the work surface platform 250 to be raised and lowered relative to the cutter arm assembly 249. The work surface platform 250 is itself adjustable to any number of angles, in conjunction with the worksurface positioning assembly 252 and in relation to the cutter arm assembly 250.

Figure 28D:
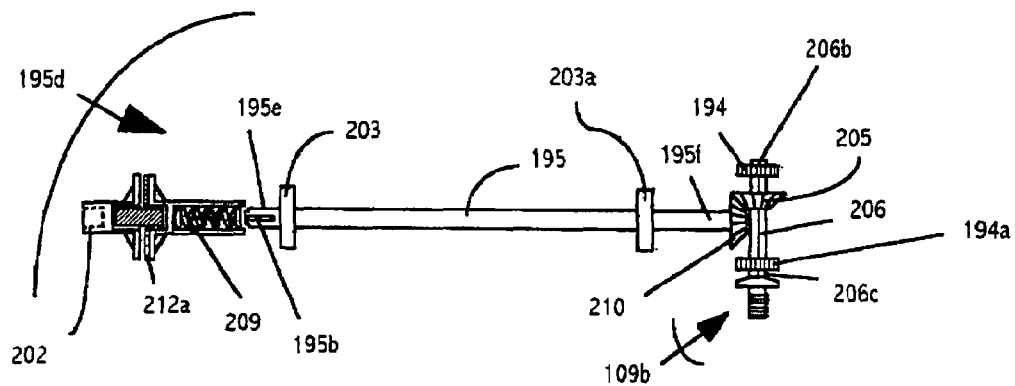
FIG. 28D is a plan view of the cutter drive assembly.
Figure 28E:
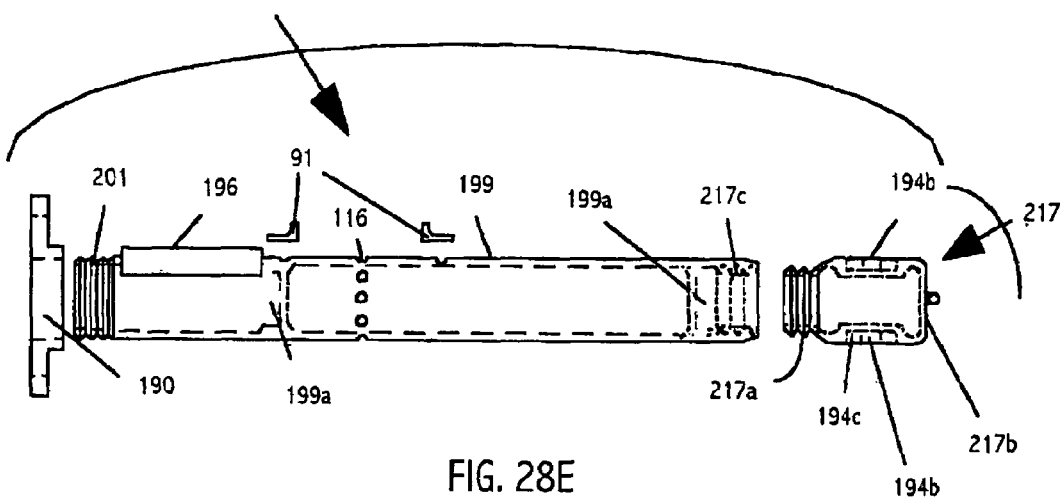
FIG. 28E is a plan view of the shaft housing.
Figure 28F:
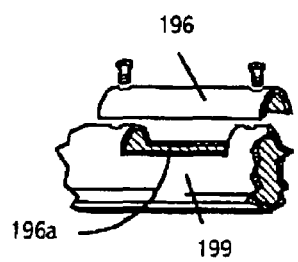
FIG. 28F is a perspective view of the clutch access opening.
Figure 30:
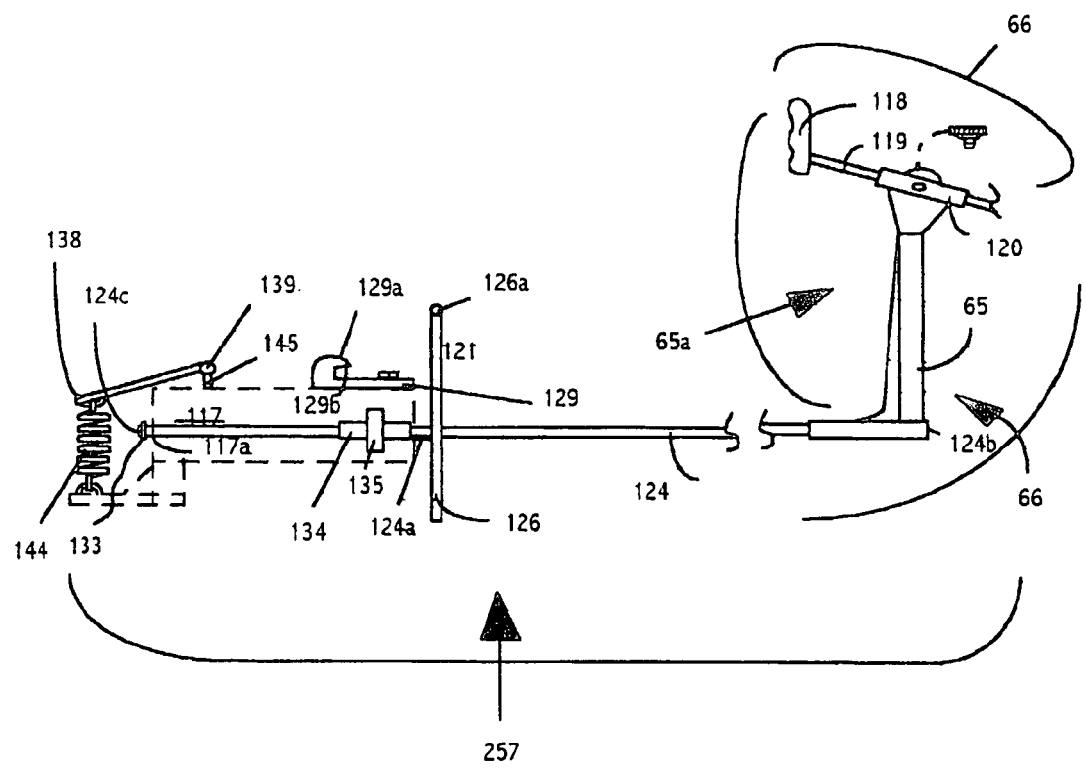
FIG. 30 is a left elevation view of the carriage control assembly.

Turning now to the components of cutter arm assembly 250. As shown in FIG. 28A, the motor 200 is mounted actually with the shaft housing 256. The motor mounting plate 190 is fixed to the motor 200 by means of a plurality of motor mounting plate bolts 198. FIG. 28B shows the motor mounting plate 190 having a motor mounting plate central aperture 201a into which the externally threaded clutch and primary shaft enclosure first end 201 is disposed. Once disposed, the clutch and primary shaft enclosure first end is secured by means of motor mounting plate set screw 190a. The opposing end of the cutter arm, the clutch and primary shaft enclosure second end 217c is internally threaded. The externally threaded gear case neck 217a is disposed within the internally threaded clutch and primary shaft enclosure second end 217c. The gear case 217 is equipped with a gear case nipple 193 for lubrication purposes. FIG. 28A further shows the motor shaft 208 dispose through the center of the motor mounting plate 190, extending into the center of shaft housing 256. FIG. 28C illustrates the relationship between the first clutch plate 211 and the second clutch plate 212. The first annular sleeve 202 is attached to the first clutch disk 211a. This attachment is strengthened by a plurality of triangular first clutch plate supports 216b mounted at pre-determined intervals around the first annular sleeve. The first annular sleeve 202 exhibits the first annular sleeve slot 202a. The motor shaft 208 is disposed within the first annular sleeve. The motor shaft 208 exhibits a corresponding longitudinal motor shaft slot 216 first key 216a is of such dimensions that it may be simultaneously disposed within first annular sleeve slot 202a and longitudinal motor shaft slot 216, thereby locking motor shaft 208 and first annular sleeve 202 in rotation. First key 216a is secured with first clutch plate set screw 204b. Clutch plate alignment pin 195a is inserted through first clutch disk central opening 211d until it comes into contact with the first annular sleeve internal stop 215c. This allows a pre-determined length of the clutch plate alignment pin 195a to protrude from first clutch disk central opening 211d. Second clutch plate 212 is attached to second annular sleeve, and again is strengthened with the plurality of second clutch disk supports 213a and a configuration substantially similar to that scene with the first clutch plate 211. The clutch plate alignment pin 195a is disposed through the second clutch disk central opening 212e and extends into the second annular sleeve and will rest against any second annular sleeve internal stop 215b. When the motor shaft 208 is in its fixed position within the first annular sleeve 202, the distance between the end of the motor shaft 208 and the first annular sleeve internal stop 215c is somewhat longer than the length of the clutch plate alignment pin 195a. This will allow the first clutch disk 211a and the second clutch disk 212b with its clutch plate friction inducing surface 212a will allow full contact with one another. Cutter drive shaft spring 209 is disposed within the second annular sleeve on the side of the second annular sleeve internal stop 215b opposed to the location of the clutch plate alignment pin 195a. The end of primary shaft 195 is narrowed to form a positioning rod 195g which is disposed a short distance within cutter drive shaft spring 209. Longitudinal primary shaft slot 195b in primary shaft 195 receives second key 195c which is also received within second annular sleeve slot 215a. Second key 195c is secured by second clutch plate set screw 204a and prevents the primary shaft 195 from rotating within the second annular sleeve. This configuration allows lateral movement of the second annular sleeve 215, along the primary shaft thereby allowing cutter drive shaft spring 209 to exert a force against second clutch plate 212, which in turn allows pressure to be exerted against first clutch plate 211. Primary shaft first bearing 203 is pressed onto primary shaft 195. Turning again to FIG. 28A, it is seen that when the primary shaft 195 is disposed within clutch and primary shaft enclosure 199, primary shaft first bearing 203 is pressed into and rests in clutch enclosure bearing seats 199a. The primary shaft 195 extends along and within the clutch and primary shaft enclosure through gear case neck 217a and into gear case 217. A primary shaft second bearing 203a is pressed onto primary shaft 195 in such a position and it is pressed into and seats into another clutch enclosure bearing seat 199a. The first beveled gear 210 is mounted on the end of primary shaft 195 that extends within gear case 217. A secondary shaft 206 is disposed within the gear case 217 at right angles to the axis of the primary shaft 195. A secondary shaft first bearing 194 is pressed onto the end of secondary shaft 206. Secondary shaft first bearing 194 is then pressed into and rests within one of the gear case bearing seat 194b. The second beveled gear 205 is mounted on the secondary shaft in such a position as to communicate with first beveled gear 210 at the end of primary shaft 195. A secondary shaft second bearing 194a is pressed onto secondary shaft 206 and extends through gear case 217 terminating at arbor 109b. The arbor 109b then receives the cutter 69, which is secured by a nut. Clutch and primary shaft enclosure 199 has a clutch access opening 196a covered by cover plate 196. The clutch and primary shaft enclosure has two internally threaded apertures corresponding to two apertures in cover plate 196 and is held in place by bolts. It will be noted that cutter drive assembly 195d, shaft housing 256, and clutch access opening 196a are respectively and separately shown in FIG. 28D, FIG. 28E and FIG. 28F.

Figure 2A:
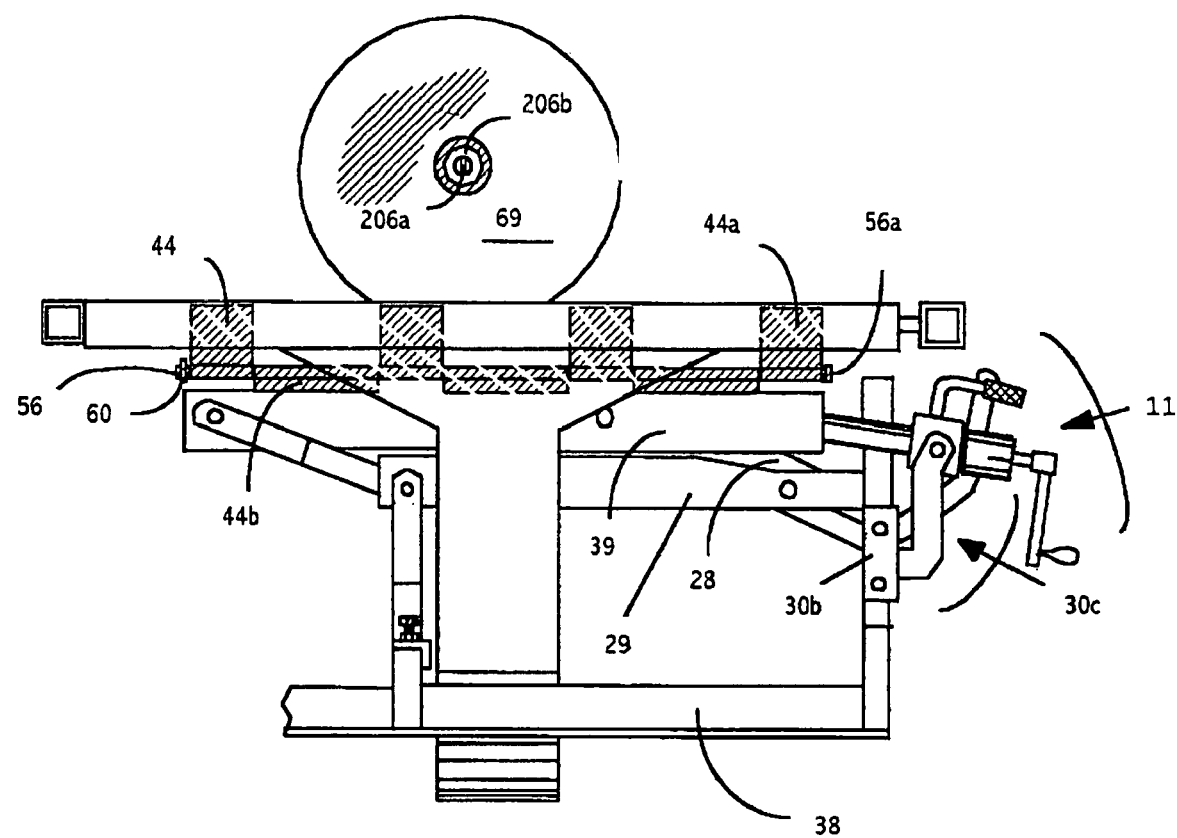
FIG. 2A is a left elevation view of the work surface platform and its relationship to the work surface positioning assembly, with the work surface positioning assembly in a contracted position.
Figure 8:
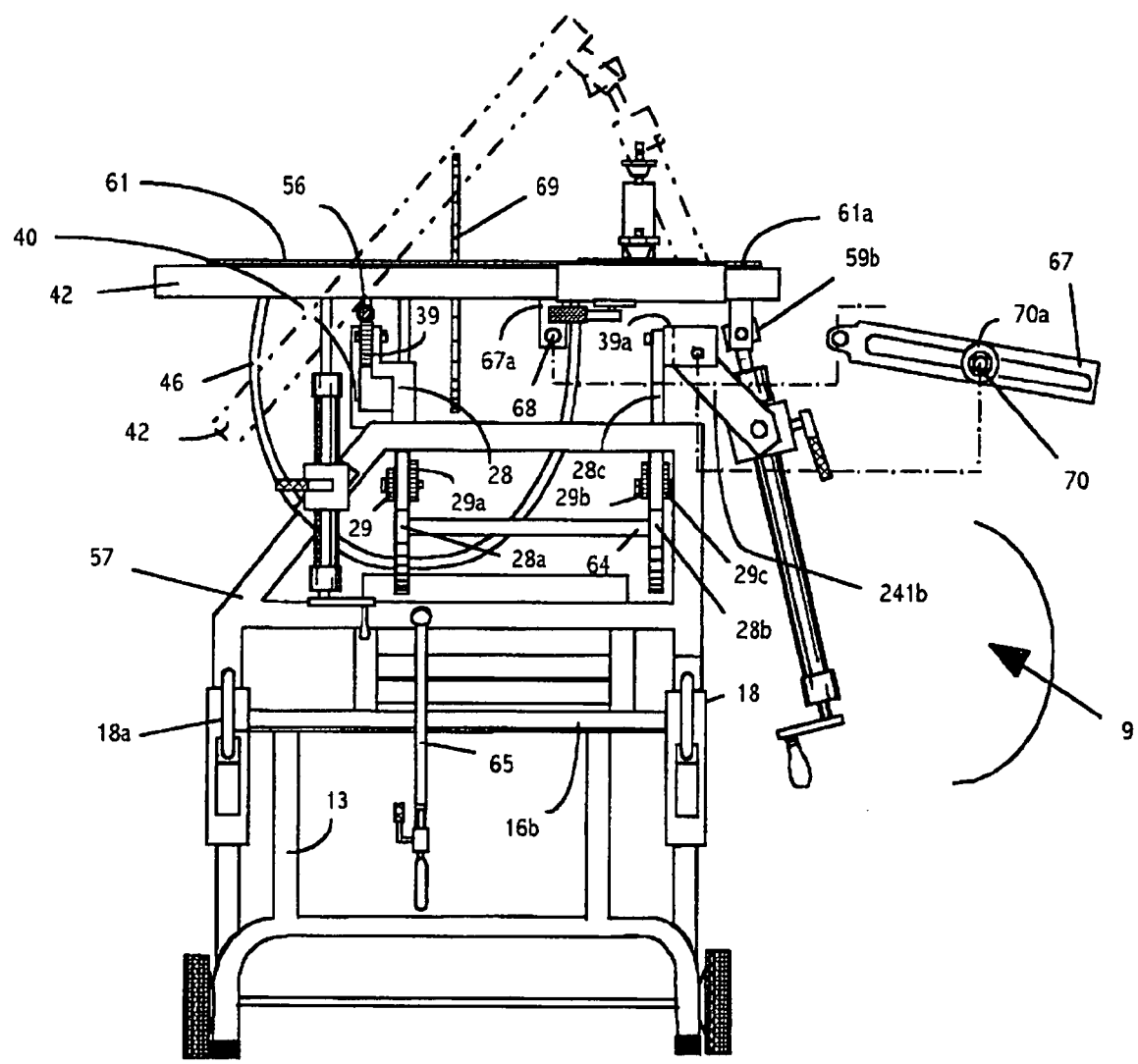
FIG. 8 is a front elevation view of the cutting workstation mounted on the mobile base assembly.

An alternative embodiment of the machine capable of routing and shaping is illustrated in FIG. 29A. This illustrates secondary shaft 206 equipped with routing chuck 207. Mounted in routing chuck 207 is straight router bit 207a. As the work piece is moved past straight router bit 207a, a milling operation is produced on work piece W. Although straight router bit 207a is illustrated, router or shaper bits and other configurations may be utilized such as cove bit 207c. FIG. 29C illustrates a configuration where the clutch and primary shaft enclosure 199 is rotating allowing production of an angled groove in work piece W. Returning to FIG. 29A, cutter stabilization clamp 245 is seen in place. Cutter stabilization clamp 245 mutually communicates with clutch and primary shaft enclosure 199 and first work surface 61 and second work surface 61a. FIG. 29B shows the major components of the cutter stabilization clamp. The major components being arm clamp 246 which communicates with clutch and primary shaft enclosure 199, table clamp 248, which communicates with first work surface 61 and second work surface 61a. Arm clamp 246 is composed of clamping jaw 246c and cutter arm anvil 246e. Clamping jaw 246c exhibits jaw hooking end 246a and jaw adjusting end 246b. Jaw hooking end 246a substantially conforms to the shape of the clutch and primary shaft enclosure 199. The jaw adjusting end 246b contains jaw adjusting internally threaded aperture 246q through which the clamping bracket adjusting handle 246h is disposed. The clamping jaw 246c hingeably communicates with cutter arm anvil 246e by means of clamping arm hinge pin 246d inserted through apertures in a pair of hinge flanges 246i and through a corresponding aperture in cutter arm anvil 246e. Cutter arm anvil 246e is mounted to arm clamp shaft 246f. Arm clamp shaft 246f is inserted into arm clamp base 247 and is adjustable in an upward and downward direction. The arm clamp base is fixed in place by arm clamp base locking handle 247b which is disposed within arm clamp base internally threaded aperture 247a. Arm clamp base 247 is mounted to clamping base 248c of table clamp 248. Clamping base 248c exhibits clamping base first end 248d and clamping base second end 248i. Clamping base first end 248d exhibits a fixed hooking bracket 248j. The fixed hooking bracket 248j hooks over and under the first work surface 61. The clamping base second end 248i communicates through second clamping base end hinge 248k with adjustable hooking bracket 248h. Adjustable hooking bracket 248h exhibits adjusting tab 248g which contains adjusting tab smooth bore 248e. Adjuster handle 248l exhibits adjuster handle threaded end 248o. Adjuster handle threaded end 248o is inserted through adjusting tab smooth bore 248e and is threaded into adjusting block internally threaded aperture 248b in adjusting block 248a. Adjusting block 248a is mounted to clamping base 248c. After insertion through adjusting tab smooth bore 248e, adjusting block snap ring 248m is mounted within the snap ring seat 248n on adjuster handle 248l. Adjusting block snap ring 248m now rests between adjusting tab 248g and adjusting block 248a. When adjuster handle 248l is rotated out of adjusting block 248a, adjusting block snap ring 248m engage adjusting tab 248g causing adjustable hooking bracket 248h to move and clamp over second work surface 61a whereby clamping the cutter stabilization clamp to the work surfaces. Arm clamp shaft 246f is then adjusted to the proper height such that clutch and primary shaft enclosure 199 is cradled in the cutter arm anvil 246e. When clamping bracket adjusting handle 246h is rotated, the threaded end that comes into contact with the arm clamp shaft causing the clamping jaw to clamp the clutch and primary shaft enclosure 199 between itself and the cutter arm anvil 246e. FIGS. 2A and 2B show the relative position of the work surface platform 250 and cutter 69 when the work surface positioning assembly is extended as in FIG. 2A and contracted as in FIG. 2B. As seen in FIG. 2A, the first work surface 61 is attached to the left horizontal member 39 to a hinge assembly 44. Hinge assembly 44 is composed of a series of work surface hinge components 44a, which communicate with a series of left horizontal member hinge components 44b by means of a horizontal member hinge pin 56 extending through the hinge components and held in place by horizontal hinge pin snap ring 60. Left horizontal member 39 is pivotally attached to left adjuster strut. While left horizontal member 39 is again pivotally attached to the left table elevation lever 28. Left adjuster strut 40 is attached to outer left bracket member 29 and inner left bracket member 29a. The left table elevation lever 28 is similarly pivotally attached to outer left bracket member 29 and inner left bracket member 29a. The left table elevation lever 28 extends below and between the outer left bracket member 29 and inner left bracket member 29a and is curved toward and extends beyond the front of the work surface positioning assembly 252 and terminates at left handle attachment end 28a. As shown in FIG. 8, the left handle attachment end 28a of the left table elevation lever 28 is attached to handle bar 64, which extends horizontally to the right side of the work surface positioning assembly 252 and attaches to right handle attachment end 28b of the corresponding right table elevation lever 28c. Also shown in FIG. 8, the right table elevation lever 28c extends between and is pivotally attached to the inner right bracket member 29b and outer right bracket member 29c. The right table elevation lever 28c then extends upward to be attached to the right horizontal member 39a. The right horizontal member 39a communicates with right adjuster strut 39d, which in turn communicates and is pivotally mounted between the inner right bracket member 29b and the outer right bracket member 29c. FIG. 2B further shows left fine adjuster strut 24 which communicates with the outer left bracket member 29 and inner left bracket member 29a. FIG. 3 illustrates the left fine adjuster strut 24. A first vertical strut component 24a and a second vertical strut component 24b extend upward from adjuster strut base 24c. Left adjuster strut 40, which is mounted between outer left bracket member 29 and inner left bracket member 29a is also mounted between first vertical strut component 24a and second vertical strut component 24b. Adjuster strut pivoting fastener 33 is inserted through second vertical strut component aperture 33a, then through outer left bracket member 29, through left adjuster strut 40, through inner left bracket member 29a and finally through first vertical strut component aperture 33d. First vertical strut component 24a and second vertical strut component 24b are mounted to the horizontal face 24d of adjuster strut base 24c. The vertical face 24e of adjuster strut base 24c contain a plurality of lateral adjust apertures 24f, which correspond to base support circular apertures 20a. Adjuster strip bolts 49 inserted through lateral adjust apertures 24f, through base support circular apertures 20a and are fixed in a position utilizing adjuster strip nuts 49a. Due to the oblong nature of lateral adjust apertures 24f, the left fine adjuster strut 24 may be moved laterally along base support 20 allowing the lateral strut adjustment and allowing adjustment of the work surface positioning assembly 252 as a whole. Horizontal face 24d also contains internally threaded vertical adjust apertures. Externally threaded vertical adjustment bolts 25 are inserted through vertical adjustment lock nuts 26 and then through vertical adjust apertures 50. Vertical adjustment bolt 25 then makes contact with base support 20 by turning the vertical adjustment bolt 25 against base support 20, vertical adjustment of the left fine adjuster strut 24 is accomplished. After vertical adjustment is accomplished, vertical adjust lock nut 26 is tightened against horizontal face 24 whereby holding vertical adjustment bolt 25 in place.

Figure 9A:
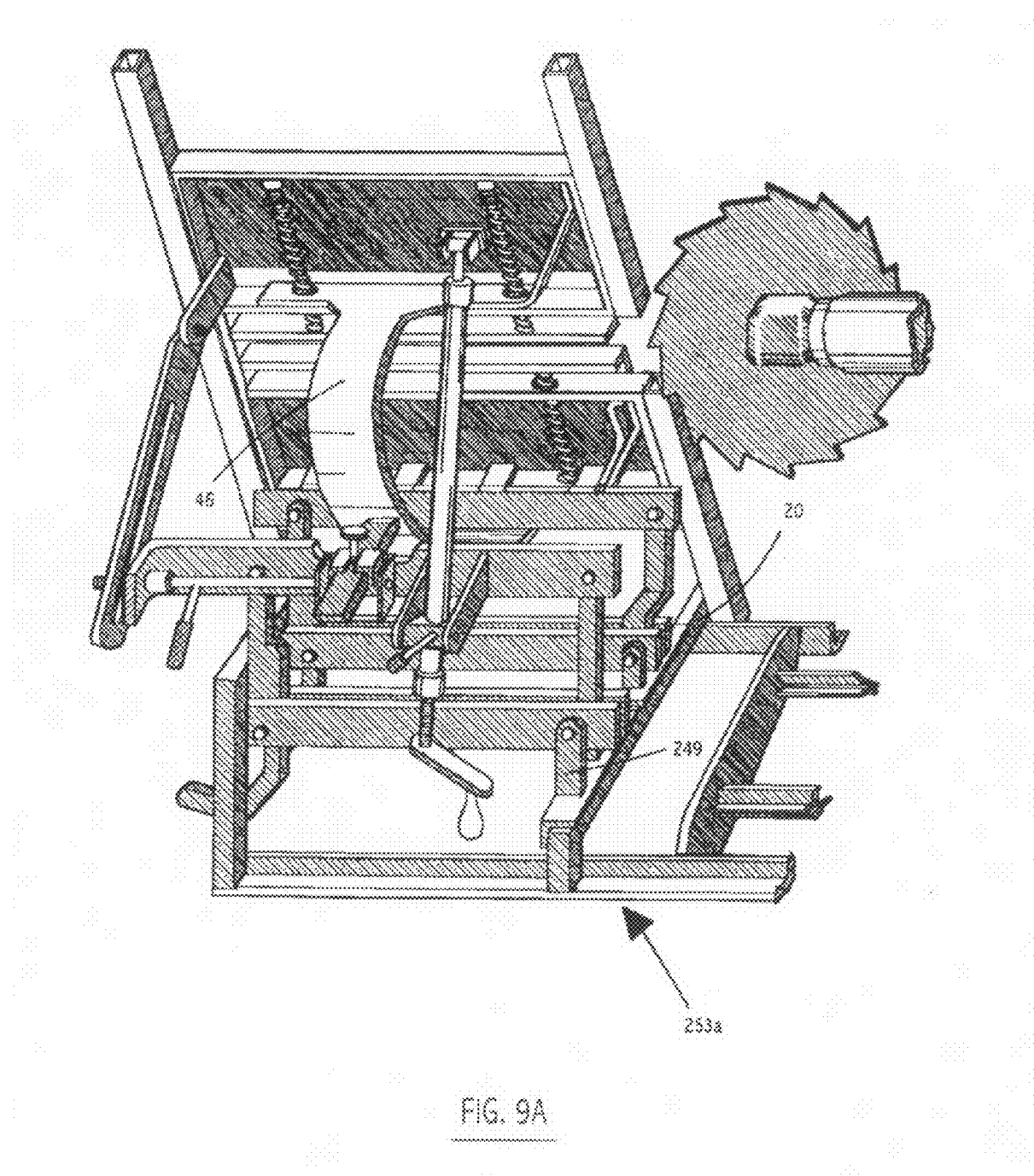
FIG. 9A is a right side perspective view showing work surface platform in an angled position.
Figure 9B:
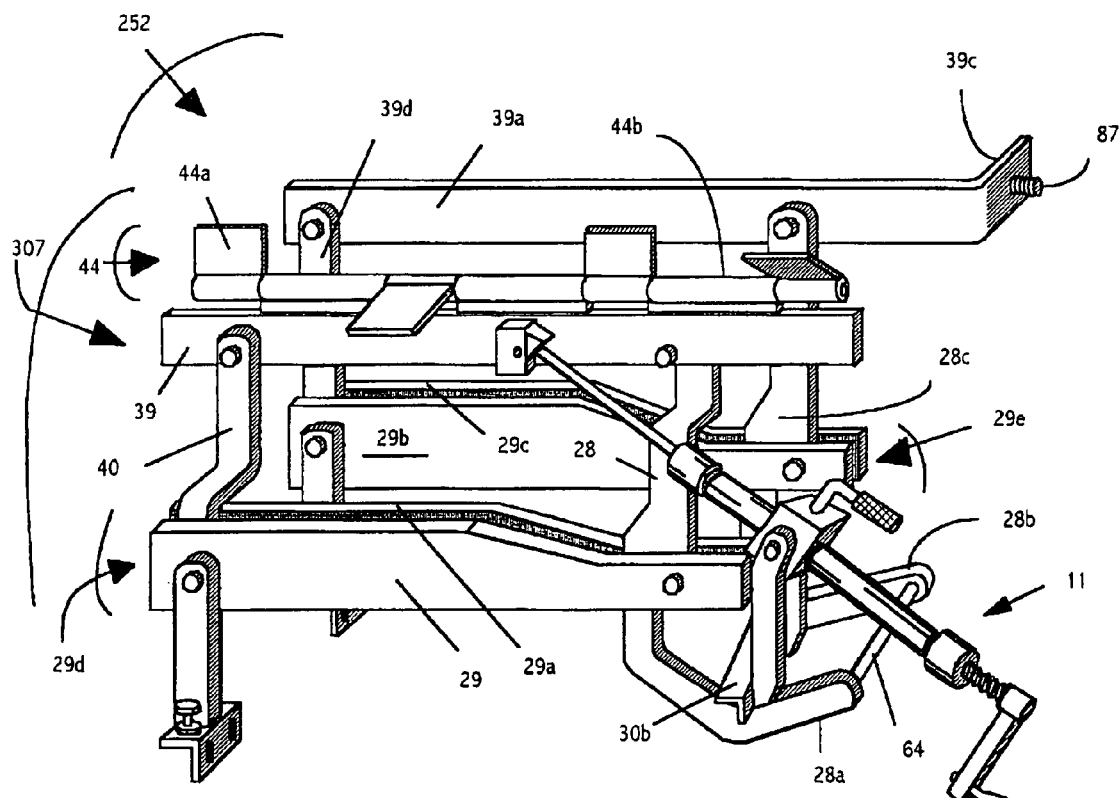
FIG. 9B is a left side perspective view of the height adjuster frame.

FIG. 9B illustrates the position of work surface height adjuster 11 in relation to the height adjuster frame 307. FIG. 9C illustrates the position of the work surface angle adjuster 9 also in relations to height adjuster frame 307. FIG. 9A shows the work surface angel adjuster 9 operating on the worksurface platform 250.

Left fine adjuster strut 24 is mounted to base support 20 extending across the work station base frame 253a. The right fine adjuster strut 24g is constructed similar to the left fine adjuster strut 24 and communicates a similar fashion with base support 20 and the outer right bracket member 29c and the inner right bracket member 29b. FIG. 8 shows the face frame 57, which is part of the work station base frame 253a. The face frame 57 communicates and is permanently mounted to both the inner right bracket member 29b and the inner left bracket member 29a and the inner right bracket member 29b and the outer right bracket member 29c. Also shown in FIG. 8 is the face frame 57, the upper left corner of which is truncated to allow the work surface positioning assembly 250 to tilt as is illustrated in FIG. 8. Returning to FIG. 2B, it can been seen when handle bar 64 is raised, the table elevation assembly 41 collapses and the work surface positioning assembly 250 is lowered, allowing the left horizontal member 39 and the corresponding right horizontal member 39a to rest on outer left bracket member 29 and inner left bracket member 29a and rest on inner right bracket member 29b and outer right bracket member 29c as seen in FIG. 2A. Conversely, when the handle bar 64 is fully lowered, the work surface positioning assembly 250 is at its maximum height. FIG. 2B also shows the work surface height adjuster 11 which is attached to face frame 57. Turning now to FIG. 7, it is seen that work surface height adjuster 11 is attached to face frame 57 by means of height mounting first strut 30 and height mounting second strut 30a. FIG. 5 shows the work surface height adjuster 11 in detail. A height adjuster central rod 32 exhibits two circumferential grooves 48a at the height adjuster central rod first end 32f FIG. 6A shows the height adjuster universal block 59 equipped with a bore through which height adjuster central rod 32 is inserted. The height adjuster universal block is positioned on height adjuster central rod 32 between circumferential grooves 48a and central rod snap rings 48 are inserted into the circumferential grooves 48a fixing the position of height adjuster universal block 59 on height adjuster central rod 32. Turning now to FIG. 4, it can be seen that the height adjuster universal block 59 is pivotally mounted within hinge box 58. Hinge box 58 is attached to the left horizontal member 39. This provides the work surface height adjuster with its attachment to the work surface platform 250. Returning to FIG. 5, it is seen that height adjuster central rod 32 is disposed through height adjuster first cap 34, first cap sealing washer 32d and first cap dust wiping washer 32e. The central rod is then disposed through height adjuster annular section 35 which has a height adjuster annular section first end 35b and a height adjuster annular section second end 35a, both of which are externally threaded. The internally threaded height adjuster first cap is then exposed over the height adjuster annular section first end 35b securing first cap sealing washer 32d and first cap dust wiping washer 32e. The externally threaded height adjuster annular section second end 35a is then disposed within height adjuster second cap wherein second cap ceiling washer 32a and second cap dust wiping washer 32b are retained. Turning again to FIG. 7, it shows height adjuster annular section 35 in place through height quick adjust block 37. FIG. 7 also shows a view of height adjuster first cap 34 with first cap internally threaded aperture 34f. The threads of the first cap internally threaded aperture 34f communicate with external threads of height adjuster central rod second end 32g. It is this communication, which allows fine adjusting movements of central rod 32. The externally threaded height adjuster central rod second end 32g is attached to cranking handle 27. Returning now to FIG. 7, it further shows the height quick adjust block 37. The height quick adjust block 37 exhibits an internally threaded top surface aperture 36b disposed within internally threaded top surface aperture 36b is pad 36a and externally threaded height adjust block set handle 36. The height adjust block set handle 36 may be deployed to secure height adjuster annular section 35 in a given position within height quick adjust block 37. Height quick adjust block 37 exhibits height quick adjust block smooth bore aperture 37a and opposing height quick adjust block smooth bore aperture 37b and are designed to receive partially threaded pins 31. Height mounting first strut 30 is attached to height quick adjust block 37 by the partially threaded pins 31 which are inserted through lock washer 31a then through internally threaded first strut aperture 31b. Height mounting second strut 30a is attached to height quick adjust block in a similar fashion allowing the height quick adjust block to pivot between height mounting first strut 30 and height mounting second strut 30a. FIG. 4 illustrates the attachment of the height adjuster central rod 32 to the left horizontal member 39 by the insertion of the height adjuster universal block 59 into hinge box 58 by aligning the internally threaded hinge box 51 and 51b with the height adjuster universal block smooth bores 59a and 59b. The external threads of first threaded pin 52 and second threaded pin 52a are disposed within the internally threaded hinge box apertures 51 and 51b allowing the pins to engage the height adjuster universal block 59 less allowing the height adjuster universal block 59 to pivot within hinge box. Hinge box 58 is fixed by hinge box mounting plate 58a which is fixed to the left horizontal member 39. Returning now to FIG. 2B, it can be seen that quick adjustment of the work surface platform is achieved by loosening height adjust block set handle 36 allowing height adjuster annular section 35 to slip within height quick adjust block 37. Upon achieving the approximate position, height adjust block set handle 36 is tightened. Further refinement of height may be achieved by rotating the height adjuster central rod 32 by turning cranking handle 27. FIG. 8 shows the work surface angle adjuster 9. It is constructed substantially similar to the work surface height adjuster 11. The work surface angle adjust is mounted to the right horizontal member 39a. FIG. 6B illustrates the height adjuster universal mounting bracket 240. The angle adjuster universal block is substantially similar to the height adjuster universal block 59. The angle adjuster universal block 58b is inserted between angle block mounting bracket first strut 240d and angle block mounting bracket second strut 240f and is secured by angle block partially threaded pin 240a and angle block partially threaded pin 240b. The pins are then inserted within angle strut internally threaded apertures 240c allowing angle adjuster universal block 58b to pivot therein. Returning to FIG. 8, it illustrates the work surface angle adjuster being attached to the angle adjuster mount 241b which is in turn attached to the right horizontal member 39a.

Figure 10:
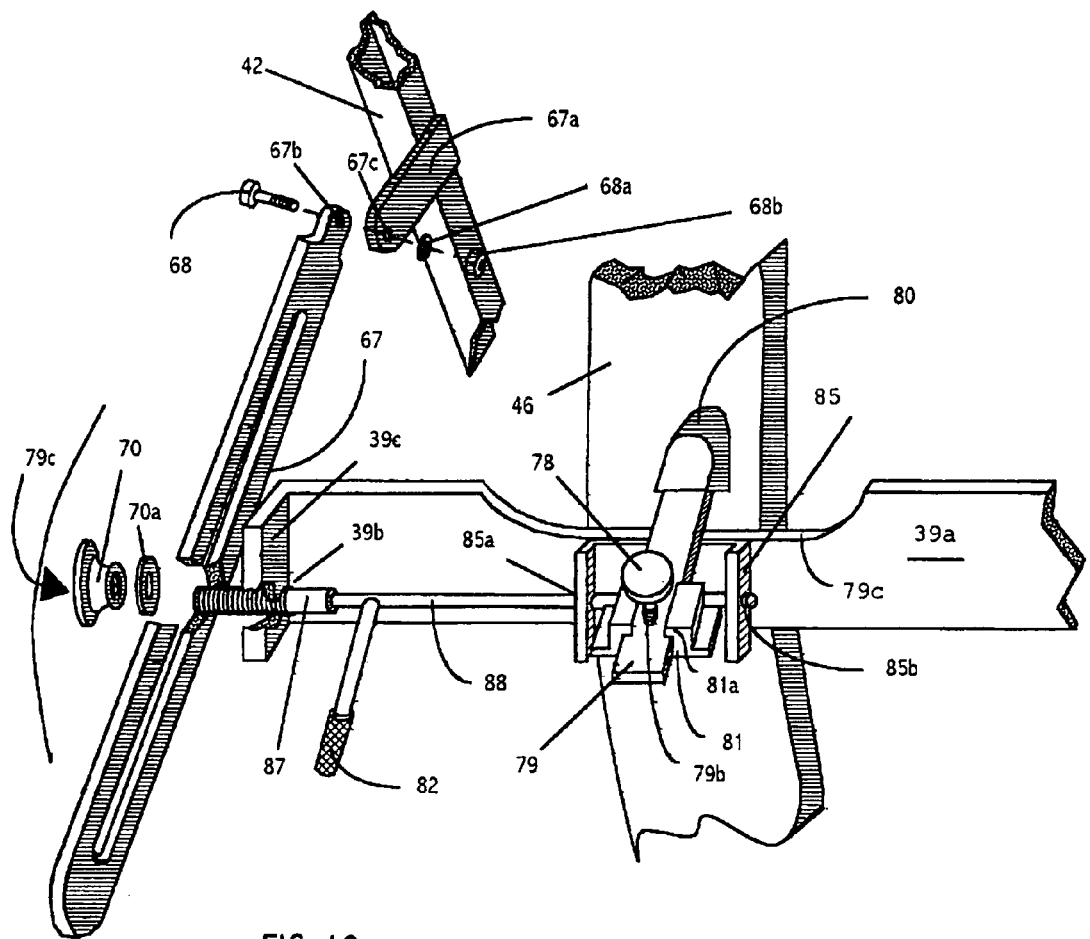
FIG. 10 is a perspective view of the stop angle adjust assembly.
Figure 11:
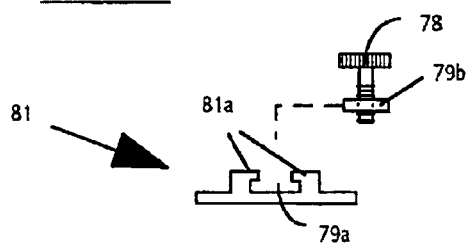
FIG. 11 is an elevation view of the slide bracket.
Figure 14:
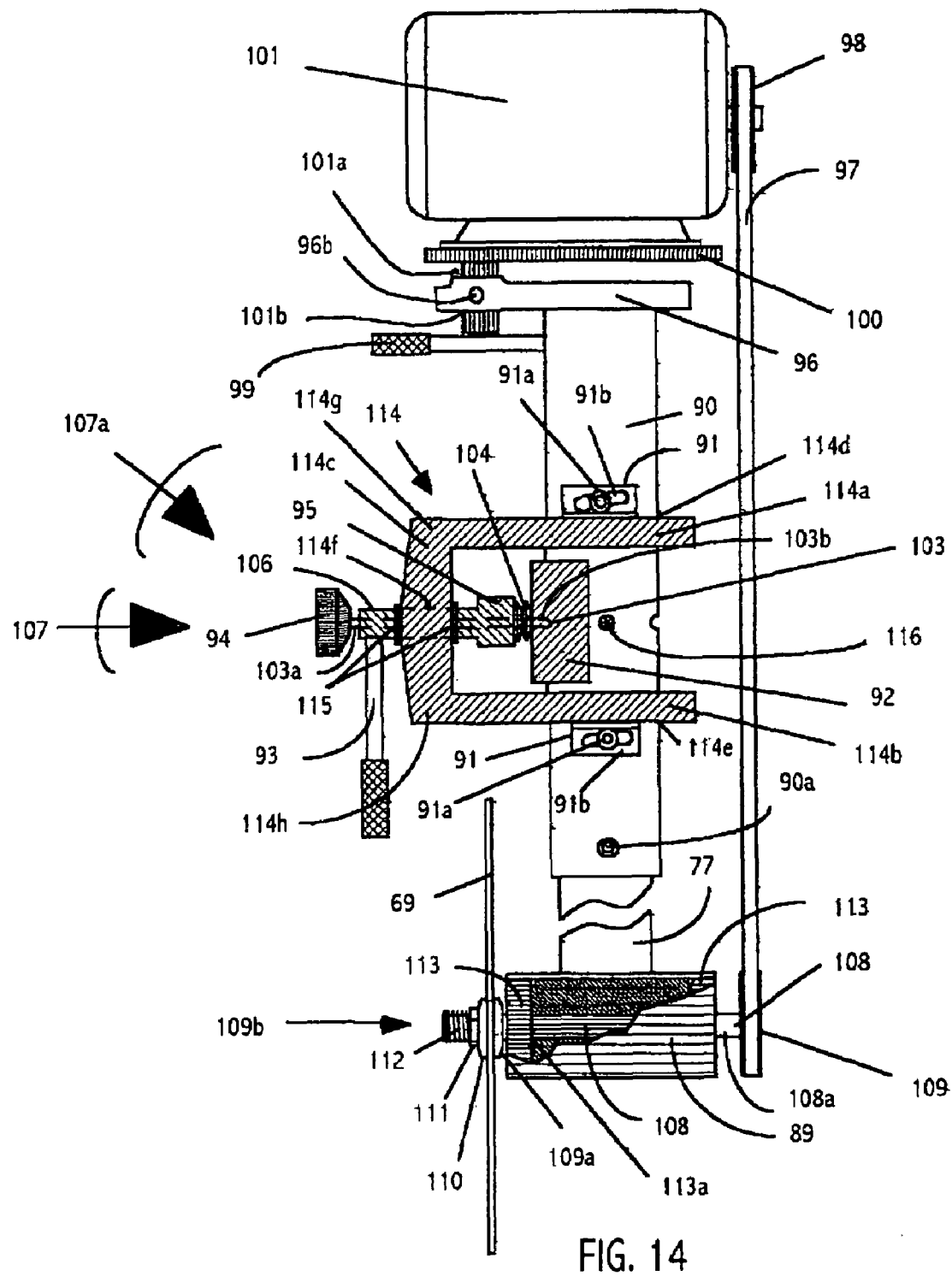
FIG. 14 is a top plan view of the rotational positioning means mounted on an alternative embodiment drive mechanism of a motor and drive belt.
Figure 14A:
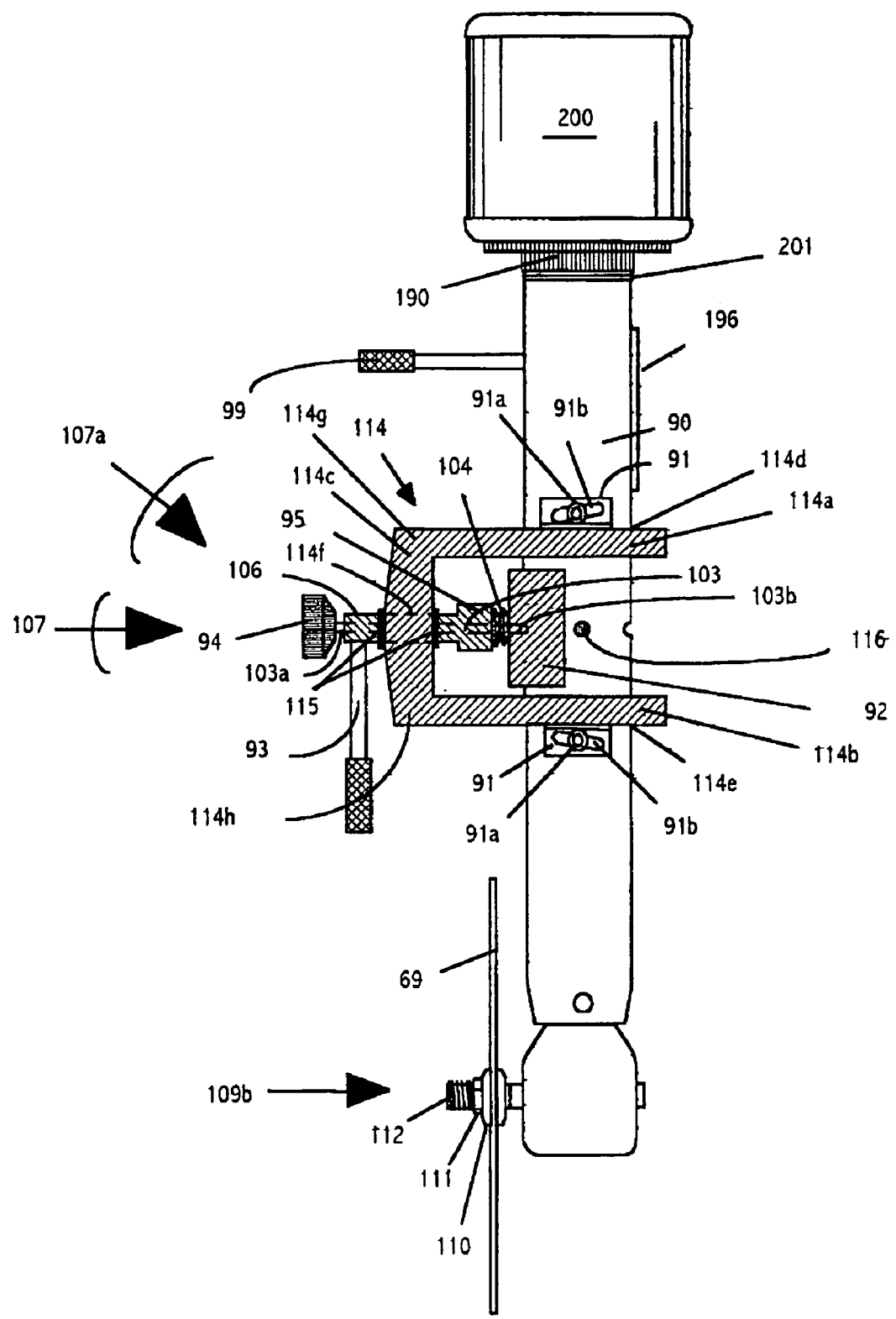
FIG. 14A is a top plan view of the rotational positioning means mounted on the cutter arm assembly.

Now turning to FIG. 10, which shows the mechanism quickly adjusting the work surface to predetermined angles. Work surface connector 46 exhibits a plurality of work surface connector stops 80 positioned partially around exterior surface. FIG. 15B best illustrates the relationship of the work surface connector 46 to the first work surface 61 and the second work surface 61a. The work surface connector 46 is attached to first side panel 61e of the first work surface 61 and the left side panel 61h of the second work surface 61a. Now returning to FIG. 10, it is seen that work surface connector stops 80 are positioned such that when engaged by rocker assembly stop arm 79, the work surfaces are fixed at certain predetermined angles such as 22.5 degrees, 45 degrees, 67.5 degrees, etc. Rocker assembly stop arm 79 is inserted through slide bracket 81. FIG. 11 shows that slide bracket 81 contains slide bracket slot 79a which exhibits overhanging retention flanges 81a, which capture the rocker assembly stop arm. The rocker assembly stop arm 79 contains a stop arm aperture 79c through which stop arm threaded knob 78 passes. Internally threaded stop arm retention washer 79b rests below rocker assembly stop arm 79. When stop arm threaded knob 78 is tightened, the stop arm retention washer 79b is drawn tight against the rocker assembly stop arm which in turn is drawn tight against the retention flanges thereby locking the rocker assembly stop arm 79 in place. By adjusting the position of the rocker assembly stop arm 79 within slide bracket 81, small variances in the angle of the work surfaces can be achieved and the angle of the work surface can best be calibrated to predetermined angles. Returning to FIG. 10, it is seen that slide bracket 81 is mounted to rod 88. Rocker bracket 85, which is mounted to the right horizontal member 39a, contains two corresponding flanges, rocker bracket first flange 85a and rocker bracket second flange 85b. Rocker bracket first flange 85a and rocker bracket second flange 85b contain two corresponding apertures through which rod 88 extends. Rod 88 rotates freely within those apertures. Slide bracket 81 is mounted on that portion of rod 88 resting within rocker bracket 85. Right horizontal member 39a exhibits a cutout 79c allowing the rocker assembly stop arm to assume a proper position in relation to the work surface connector stop 80. Externally threaded sleeve 87 is received within right horizontal member threaded aperture 39b in addition to being held within the corresponding apertures of the rocker bracket first flange 85a and rocker bracket second flange 85b, rod 88 is mounted within threaded sleeve 87 allowing free rotation. Rocker handle 82 attached to rod 88 allows rotation of rod 88 and consequent movement of the rocker assembly stop arm toward or away from work surface connector stops 80. The threaded sleeve 87 extends through angled flange 39c and through slotted brace 67. Slotted brace washer 70a is placed over threaded sleeve 87 and slotted brace knob 70 is mounted thereon. When slotted brace knob 70 is tightened, it secures slotted brace 67 in position. Slotted brace 67 is pivotally attached to slotted brace bracket 67a. Slotted brace bracket 67a is mounted to front rail 42. Front rail 42 is, in turn, mounted to the second work surface 61a at the second work surface assembly front panel 61f. The ability to secure slotted brace 67 by means of slotted brace knob 70 allows the work surface to be positioned between predetermined angles established by the work surface connector stops 80. FIG. 12 illustrates the relationship between the first work surface assembly 300, the cutter 69, and the second work surface assembly 300a. Within the first work surface assembly 300 is first work surface 61. Similarly within the second work surface assembly 300a is second work surface 61a. First work surface 61 and second work surface 61a are separated by a space, the width of which is modifiable by the activation of the first inserted adjusting means 301 and the second inserted adjusting means 301a. When the inserted adjusting means are activated, the distance between the first work surface insert 76 and the second work surface insert 76a is either narrowed or expanded. The cutter 69 mounted to the cutter arm 90 rides on the cutter arm positioning assembly 251 forward and between the first work surface insert 76 and the second work surface insert 76a thereby performing a cross cut on the work piece. Further, the cutter arm positioning assembly 251 may be locked in any position, completely rearward, completely forward or any variation inbetween. At any fixed position, a chop cut can be performed or a rip cut can be performed by moving the work piece into the cutter. In addition, if the shape of the piece to be milled warrants, the cut can be initiated in a chop cut fashion cutting through or to any desired depth and then the cut may be transformed into the cross cut or rip cut. FIG. 13 illustrates the cutter arm lock 107. Cutter arm 90 is capable of 360 degree rotation and contains a plurality of clutch and primary shaft enclosure smooth bores 116 around its circumference at predetermined positions. Central rod knob 94 is fixedly mounted to cutter arm lock central rod first end 103a. Cutter arm lock central rod second end 103b extends through clutch and primary shaft enclosure smooth bores 116 thereby locking cutter arm 90 at a predetermined position which in turn determines the angle of the cutter 69. The travel of the cutter arm lock central rod 103 through the clutch and primary shaft enclosure smooth bores 116 is limited by central rod stop 105. Positions and consequent angles between those established by the clutch and primary shaft enclosure smooth bores 116 are achieved by the use of the brake 92a of the cutter arm lock shoe 92. The brake 92a having a concave face which communicates with the convex exterior of cutter arm 90. Cutter arm lock shoe 92 exhibits an externally threaded cutter arm lock shoe neck 104. Cutter arm lock central rod 103 extends through shoe setting neck aperture 104a which itself extends through brake 92a. The shoe setting neck aperture 104a is large enough to accommodate central rod stop 105 as well as shoe setting spring 102 which when in position over the cutter arm lock central rod 103 and within cutter arm lock shoe 92, rests against central rod stop 105. The shoe setting cap 95 exhibits an internally threaded shoe setting cap aperture and also large enough to accommodate shoe setting spring 102. The shoe setting cap exhibits a shoe setting cap first end 95b and a shoe setting cap second end 95c. Shoe setting cap first end 95b exhibits a shoe setting cap central bore 95d. Shoe setting cap tube 106 is disposed over shoe setting cap central bore 95d. Shoe setting cap tube 106 exhibits shoe setting tube snap ring grooves 106a designed to receive shoe setting tube snap rings 115. The cutter arm lock central rod extends through shoe setting cap tube 106. Shoe setting cap handle 93 is mounted to shoe setting cap tube 106 and operates to rotate shoe setting cap 95 allowing it to be disposed over the cutter arm lock shoe neck 104. This compresses shoe setting spring 102 between shoe setting cap 95 and central rod stop 105. When central rod knob 94 is pulled, cutter arm lock central rod 103 is withdrawn from the clutch and primary shaft enclosure smooth bores 116 releasing the cutter arm 90 and allowing the rotation. If the cutter arm lock central rod second end 103b is outside an aperture and riding on the surface of cutter arm 90, shoe setting spring 102 exerts pressure on central rod stop 105 which transmits the pressure to the cutter arm lock central rod 103 such that when the cutter arm lock central rod second end 103*b* encounters a succeeding clutch and primary shaft enclosures smooth bores 116, cutter arm lock central rod 103 is automatically seated. FIG. 14 shows an alternative embodiment of the cutter arm assembly 249 as well as the cutter arm lock 107. Turning first to the cutter arm lock mechanism 107, it is seen that collar 114 is composed of a collar first leg 114*a*, collar second leg 114*b*, and a transverse collar section 114 joining the two legs. Collar first leg 114*a* exhibits collar first bore 114*d*, while collar second leg exhibits collar second bore 114*e*. Cutter arm 90 is disposed through collar first bore 114*d* and collar second bore 114*e*. The transverse collar section 114*c* also exhibits central angular transverse collar section aperture 114*f* through which shoe setting cap tube 106 is disposed. Shoe setting cap tube 106 is held in position by shoe setting tube snap rings 115. When the cutter arm lock 107 is rotated clockwise onto the cutter arm lock shoe neck 104, it causes cutter arm lock shoe 92 to pull away from cutter arm 90. This allows the cutter arm to be repositioned. When the cutter arm lock 107 is rotated counter clockwise, cutter arm lock shoe 92 and brake 92*a*, frictionally engages cutter arm 90 allowing cutter arm to be positioned at any angle in addition to the angle predetermined by the location of clutch and primary shaft enclosures smooth bores 116. Collar positioning tabs 91 respectively contain collar positioning tab openings 91*b* through which collar positioning tab set screws 91*a* attach collar positioning tabs 91 to cutter arm 90. The collar positioning tab openings are elongated and oriented toward opposing corner of the collar positioning tabs 91. This allows the position of the collar 114 to be adjusted to facilitate the seating of cutter arm lock central rod 103 within clutch and primary shaft enclosure smooth bores 116.

Figure 15A:
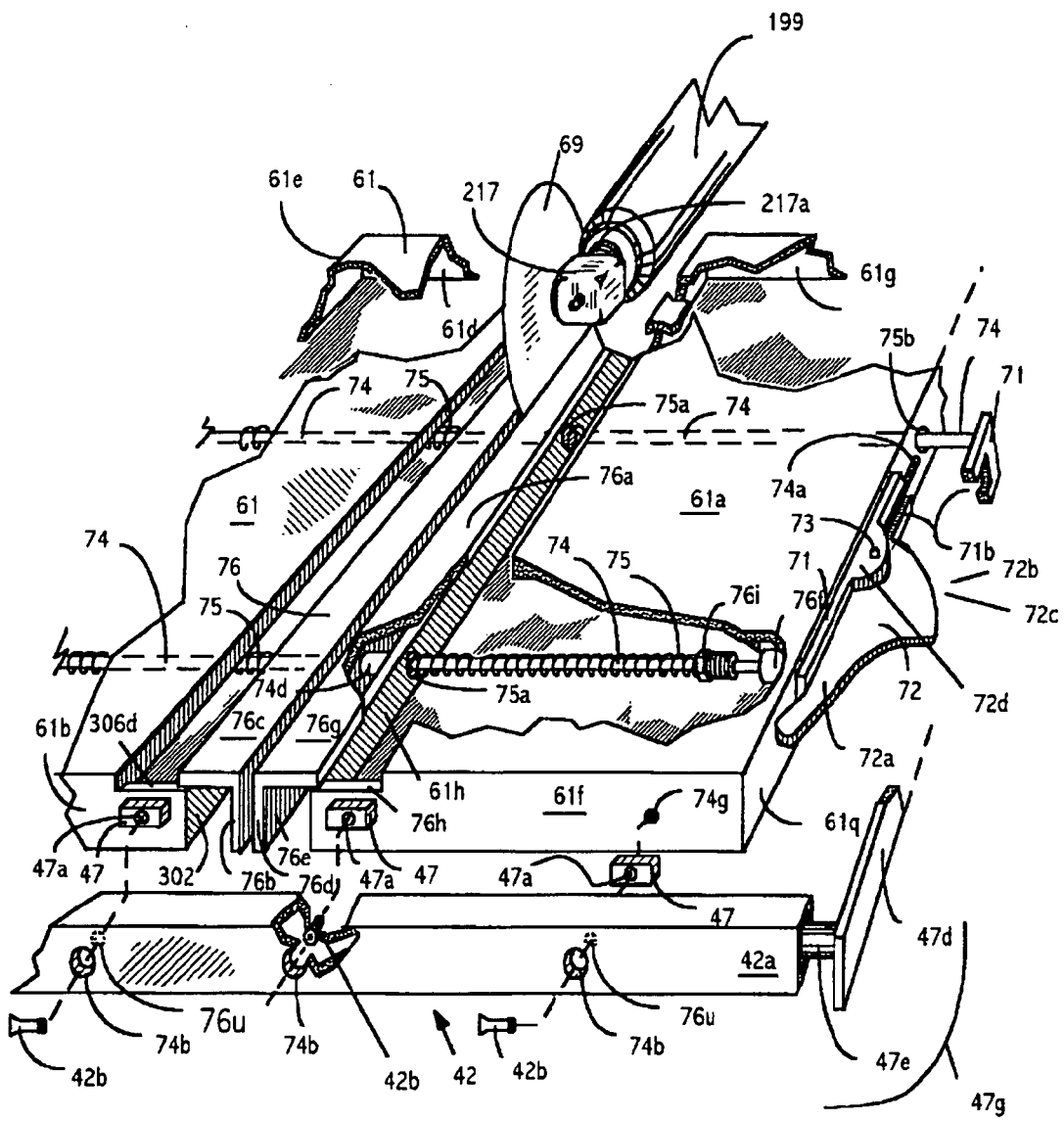
FIG. 15A is a perspective view of the work surface assemblies showing the work surface insert components and lateral work surface extensions.
Figure 15D:
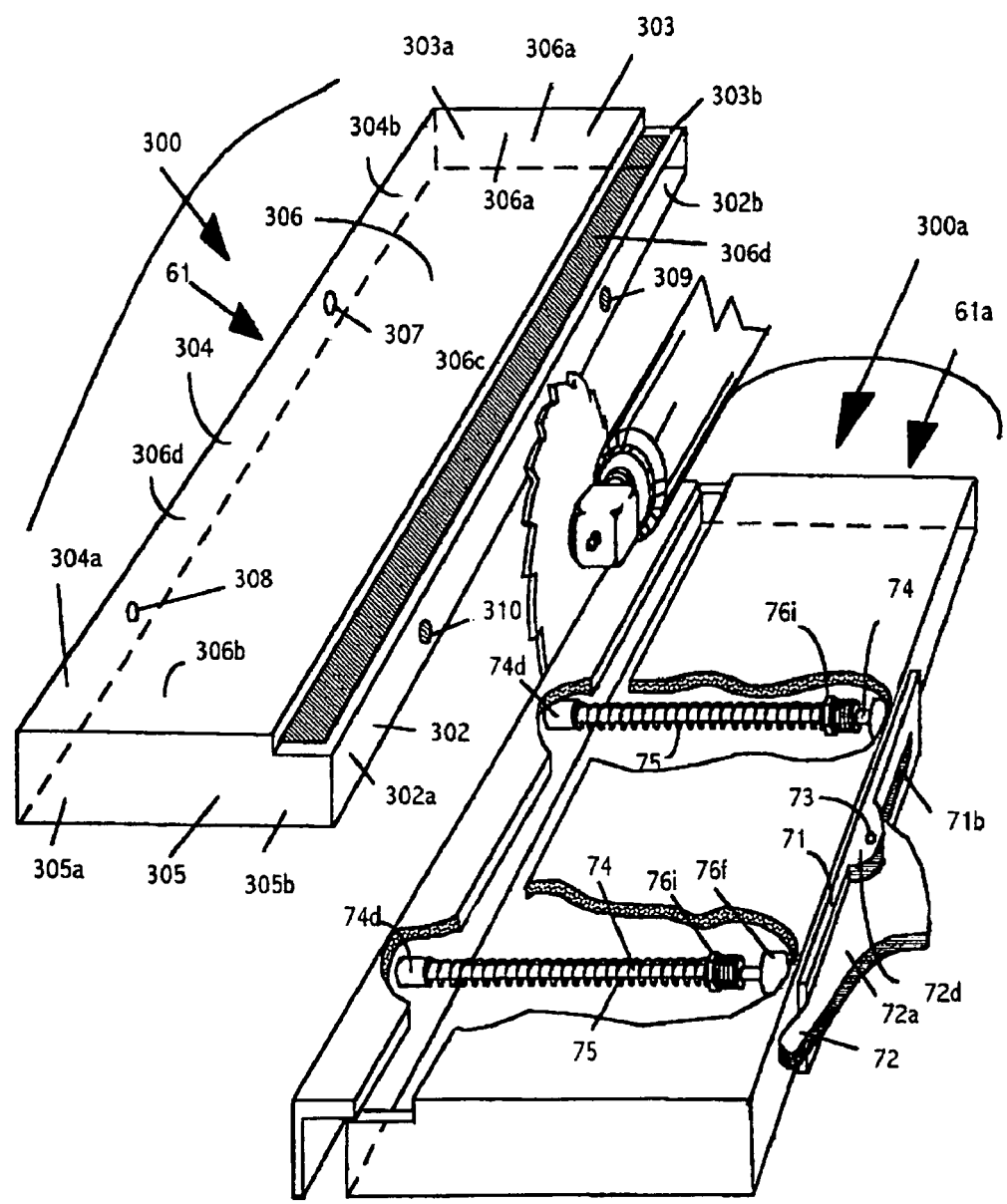
FIG. 15D is a perspective view of the work surface assemblies.

Returning to the alternative embodiment of the cutter arm and cutter drive mechanism. Here, in contrast to the preferred embodiment, the motor 101 is mounted perpendicularly to the longitudinal axis of cutter arm 90 on motor mount 100. Motor mount 100 also exhibits a motor mount annular shaft 101*a* extending perpendicularly from the plane of motor mount 100. Mounted to cutter arm 90 is plate 96. Plate 96 contains a plate annular aperture 101*b* within which motor mount annular shaft 101*a* is disposed such that motor mount 100 may rotate. Plate set screw 96*a* is disposed within plate set screw aperture 96*b* and plate 96 such that the set screw communicates with motor mount annular shaft 101*a*, hocking plate 96, and consequently cutter arm 90 in a fixed position. Belt drive motor 101 is attached to it. First pulley 98 that communicates with drive belt 97, which in turn communicates with the second pulley 109, located at bearing closure 89. Bearing closure 89 is to tubular in shape and mounted to cutter arm extension 77. Cutter arm extension 77 is tubular in nature and is disposed of within tubular cutter arm 90 and is held in a particular position by 90*a*. Further cutter arm extension 77 may be rotated within cutter arm 90 allowing precise calibration of the angle of the cutter 69 in relation to the clutch and primary shaft enclosure smooth bores 116. Bearing sets 113 are mounted at each end of tubular bearing and closure 89. Axle 108 is disposed through bearing sets 113 and disposed within bearing enclosure 89 and is mounted perpendicularly on and to cutter arm extension 77. Second pulley 109 is mounted to axle first end 108*a* with arbor 109*b* mounted to axles second end. FIG. 15D is a perspective view of portions of the first work surface assembly 300 and second work surface assembly 300*a*. A portion of first work surface assembly 300 is designated as first work surface 61. Not only are we extending from first work surface 61 is first work surface front panel 305, the first work surface outer panel 304, first work surface rear panel 303, first work surface inner panel 302. In combination with first work surface top panel 306 creates a rectangular box-like configuration with an open bottom comprising the first work surface 61. On the interior edge of first work surface top panel 306, the first work surface front panel 305, the first work surface rear panel 303, the first work surface top panel 306, and the first work surface inner panel 302 are modified to form a top panel ledge 306*d*. Turning now to FIG. 15A, it is seen that the first work surface insert 76, has first work surface insert horizontal component 76*c* and a first work surface insert vertical component 76*b*. In its retracted position, the first work surface insert horizontal component 76*c* rests on the top panel ledge 306*d* such that the first work surface 61 is flush with the first work surface insert horizontal component 76*c* forming a contiguous plane. Further, in its retracted position, the first work surface insert vertical component 76*b* rests flush with first work surface inner panel 302. The configuration of the second work surface assembly 300*a* is substantially similar to that described above for the first work surface assembly 300. Turning now to FIG. 15B, it can be seen that the insert adjusting rods 74 communicate with the interior surface of the first work surface insert vertical component 76*b*. The insert adjusting rods 74 extend through insert adjusting rod apertures 75*a* in first work surface inner panel 302. The insert adjusting rod 74 are further disposed through adjusting rod compression springs 75 and thence through internally threaded spring adjuster seat 76*f*, which form apertures in first work surface outer panel 304. Spring adjuster 76*i* is then threaded into spring adjuster seat 76*f*. FIG. 15C illustrates this relationship in a magnified view. This is repeated for both insert adjusting rods 74. The insert adjusting rods 74 has the exit through spring adjuster seat 76*f* mutually communicate with first adjusting handle bracket 71. As can be seen in FIG. 15D, midway along first adjusting handle bracket 71 are two lever mounting brackets 72*d*. Lever mounting bracket pin 73 extends through apertures in lever mounting brackets 72*d* and the corresponding aperture in the adjuster handle 72 allowing adjuster handle 72 to pivot. Adjuster handle 72 has a curved face portion 72*b*. An alternative embodiment of adjuster handle 72 would exhibit a facet face 72*c* as can be clearly seen in FIG. 15B. Returning now to FIG. 15D, we see that when handle portion 72*a* rests against the handle bracket, the work surface insert is fully extended. Resting at its maximum distance from the work surface. When handle portion 72*a* is rotated away from the work surface, then the work piece support abuts the work surface. Returning to FIG. 15B, it can be seen that when adjuster handle 72 is rotated away from the first work surface 61 adjusting rod compression springs 75 are compressed between spring adjuster 76*i* and the first work surface insert. This provides tension between the curved face portion 72*b* of the adjuster handle 72 and the first work surface outer panel 304, allowing adjuster handle 72 to remain in the set position. Further assisting the adjuster handle to remain in set position, it is groove 74*f*.

Thus, it can be seen that if both the first work surface insert 76 and the second work surface insert 76*a* are fully extended, it provides the narrowest path for cutter 69 to traverse. If both work surface inserts are retracted, it provides the widest path for the cutter 69 allowing work pieces of regular dimensions to be partially positioned below the work surface and still be operated upon. FIG. 15A also shows front rail 42. Front rail 42 has a series of front rail perforations 74*b* on front rail front face 42*a*. Corresponding rear face perforations 76*u* of a smaller diameter occur in the opposing face of front rail 42 allowing front rail screws 42*b* to be inserted through front rail perforations 74b, then through rear rail perforations 76u, thence through spacer aperture 47a, then into work surface aperture 74g. In this way front rail 42 is mounted to the front panels of first work surface 61 and second work surface 61a. Front rail 42 extends across and beyond the width of the work surfaces. Now turning again to FIG. 15B, at the rear of first work surface 61 and second work surface 61a, second rear rail 43 and first rear rail 43a are respectively mounted in a similar fashion as front rail 42. However, first rear rail 43a and second rear rail 43 are mounted such that the cutter 69 can pass between them. Further, it can be seen that second lateral work surface extension 47f is comprised of first bar 47d and first bar first tube 47c and first bar second tube 47e. First bar first tube 47c is inserted within second rear rail 43 and first bar second tube is inserted in front rail 44f. The first lateral work surface extension is similar constructed and mounted opposite to the second lateral work surface extension 47f.

FIG. 15B also serves to illustrate the configuration of attachment of work surface connector 46. Work surface connector 46 contains four work surface connector perforations 75g through which insert adjusting rods 74 pass. Work surface connector 46 is secured to the second work surface inner panel 61h and first work surface outer panel 304. Work surface connector 46 exhibits work surface connector first strut 46a and work surface connector second strut 46b which extends to the rear walls of their respective work surfaces. Hinge mounting brackets 76q is fixedly attached to the first work surface and extends parallel to first work surface outer panel until it meets work surface connector strut 46a and is mounted thereto. Mounted to the hinge mounting brackets 76q is hinge assembly 44 which consists of a plurality of hinges.

FIG. 16A shows the components of the cutter work station that allow the elevation of the cutter arm 90 and allows chop cutting and is consequently termed the elevation and chop cut carriage 112a. Carriage lock housing 117 communicates with base hinge 138. Base hinge 138 exhibits horizontal base end component 138a and vertical base hinge component 145. Both joined by base hinge pin 139. As illustrated in FIG. 16A, carriage lower platform 137 is composed of carriage lower platform base 137c, carriage lower platform first side wall 137a and carriage lower platform second side wall 137d. Turning to FIG. 16B, first catch 121 is pivotally mounted to carriage lower platform first side wall 137a and carriage lower platform second side wall 137d, and extends below and through catch opening 137e (visible on FIG. 16A) such that when carriage lower platform is horizontal, first catch 121 communicates and interlocks with second catch 129 mounted on carriage lock housing top 154a (visible in FIG. 20B). When first catch 121 and second catch 129 interlock, cutter arm 90 is fixed in a horizontal position allowing cross cut and rip operations. The horizontal base hinge component 138a is mounted to carriage lock housing and communication with tension spring 144, which in turn communicates with the carriage lock housing 117. Tension spring 144 operates on the rear edge of carriage lock housing 117 through its attachment with the horizontal base hinge component 138a allowing the forward edge of the carriage lower platform to elevate. FIG. 18A illustrates the catch activating mechanism. First catch 121 exhibits first catch aperture 121f. First catch pin 121c extends through an aperture in carriage lower platform first side wall 137a and then through second catch spacer 121h and out through a corresponding aperture and carriage lower platform second side wall 137d. First catch pin 121c is held in position by the first catch pin head 121k and first catch pin snap ring mounted outside carriage lower platform second side wall 137d and seated in first pin annular groove 121d. Leaf spring 121g is mounted between half moon tabs 121l, which protrude from carriage lower platform base 137c. Leaf spring 121g is held to the carriage lower platform base 137c at leaf spring bolt 121i. Pass through leaf spring aperture 121m and a corresponding aperture in carriage bolt platform base 137c and fixed with leaf spring nut 121j. Leaf spring 121g is mounted substantially in the center of the carriage lower platform base 137c so it corresponds with the position of first catch 121 and communicates therewith. Leaf spring 121g is also positioned to apply continuous pressure to catch 121. Turning now to FIG. 16B, it can be seen that second catch 129 is positioned in such matter that when carriage lower platform 137 is lowered toward the upper surface of carriage lock housing 117, the first catch curved face 121n of first catch 121 contacts the second catch curved face 129a of second catch 129 such that first catch 121 depresses leaf spring 121g until first catch tooth 121o of first catch 121 passes below second catch tooth 129b of second catch 129. Leaf spring 121g then presses on first catch 121 causing second catch tooth 129b and first catch tooth 121o to interlock. Returning to FIG. 18A, it can be seen that first catch 121 is released from its interlock position with second catch 129 by means of offset catch cam 121a. Second catch pin 121p extends through an aperture in carriage lower platform first side wall 137a, then through third catch spacer 121r, then through offset catch cam aperture 121s, then through first catch spacer 121u and out through a corresponding aperture and carriage lower platform second side wall 137d. Second catch pin 121p is held in position in a similar fashion as first catch pin 121c. However, second catch pin 121p is fixed to offset catch cam 121a. Further, second catch pin 121p exhibits catch handle 121b. When second catch pin 121p is rotated, offset catch cam 121a communicates with first catch 121 which in turn depresses leaf spring 121g. First catch 121 is moved away from second catch 129 causing first catch tooth 121o to disengage from second catch tooth allowing carriage lower platform 137 to rise.

Carriage lower platform first side wall 137a and carriage lower platform second side wall 137d exhibit a plurality of pivotally mounted carriage struts 112c, which also pivotally communicating with and lending support to carriage upper platform 128. Turning now to FIG. 16A, it is seen that the serrated arm 130 extends downward and rearward between first offset cam support 142 and second offset cam support 142c. The serrated arm 130 communicates with serrated arm tension spring 131, which in turn communicates with the carriage lower platform base 137c. When the serrated arm 130 is drawn rearward, carriage upper platform 128 pivots rearward on pivotally mounted carriage struts 112c causing carriage upper platform 128 and consequently the cutter arm 90 to lower. At the same time the tension in the serrated arm tension spring 131 is increased. Turning now to FIG. 17, it is seen that the first offset cam support 142 and the second offset cam support 142c are mounted to carriage lower platform first sidewall 137a and carriage lower platform second sidewall 137d, and extend upward and rearward. First offset cam support 142 and second offset cam support 142c exhibit corresponding apertures, through cam lobe axle 132a extends. Thus, cam lobe axle 132a creates a pivotal mounting for offset cam lobe 140. Offset cam lobe 140 is fixedly attached to cam lobe axle 132a and mounted between first offset cam support 142 and second offset cam support 142c. One end of cam lobe axle 132a exhibits cam lobe axle handle 132. When cam lobe axle handle 132 is activated, offset cam lobe 140 rotates within first offset cam support 142 and second offset cam support 142c. Each offset cam support exhibits an additional pair of corresponding apertures through which elongated tabs 141a of carriage elevation locking shoe 141 extend allowing carriage elevation locking shoe 141 to be pivotally mounted between the offset cam supports. Serrated arm catch 143 is mounted between carriage lower platform first side wall 137a and carriage lower platform second side wall 137d. In this configuration, when cam lobe axle handle is activated, offset cam lobe 140 is rotated into contact with carriage elevation locking shoe 141 which in turn contacts serrated arm 130 forcing serrations 130a to communicate with serrated arm catch 143. Friction between offset cam lobe 140, carriage elevation locking shoe 141 and the upper surface of the serrated arm 130 will assist offset cam lobe 140 to maintain its position. The pressure exerted by offset cam lobe 140 causes serrated arm catch 143 to remain in position between serrations 130a, locking the carriage upper platform 128 in a temporarily fixed position thus counteracting the tension in serrated arm tension spring 131. Placing serrated arm catch 143 between the various serrations 130a determines the height of carriage upper platform 128 and consequently the height of cutter arm 90.

Figure 19:
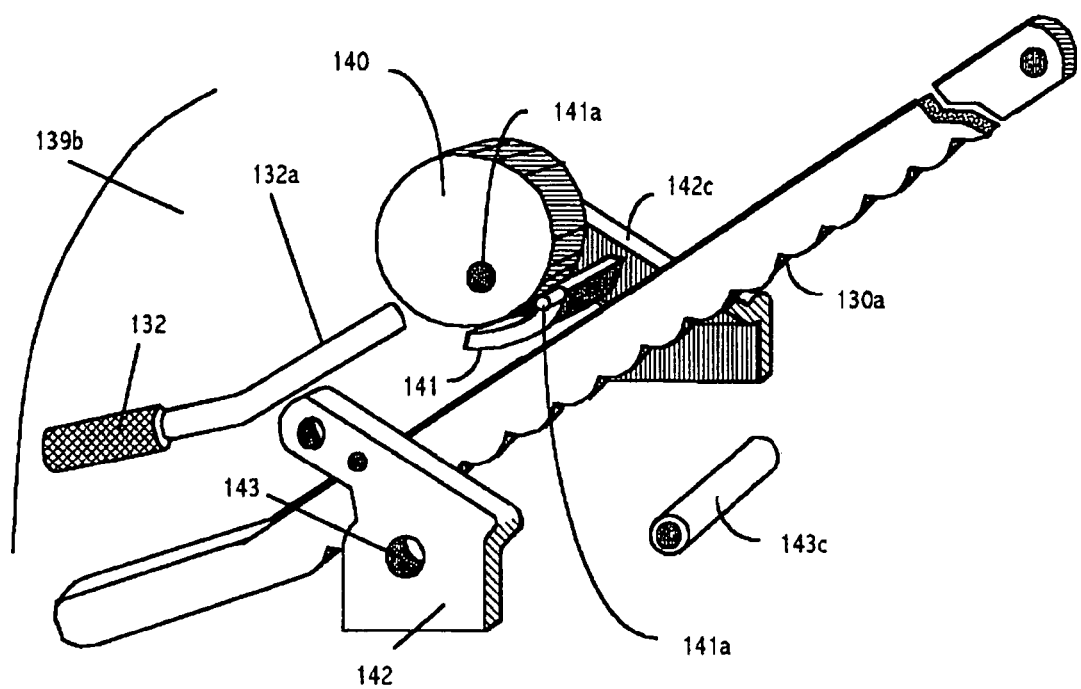
FIG. 19 is a perspective view of the carriage elevation locking assembly.

FIG. 19A illustrates the carriage lock assembly 149 in its relationship to first rail 253g. Further shown in 19A is the carriage locking offset cam lobe 135 disposed within carriage lock cam housing 149a. FIG. 21 illustrates an end view of first rail 253g. First rail 253g has a first rail lower component 84a and a first rail upper component 84b and their parallel configuration. First rail lower component 84a exhibits first rail lower component lip 84c while first rail upper component 84b exhibits first rail upper component lip 84d. First rail lower component 84a and first rail upper component 84b exhibit a plurality of first real spacers 155, which appear periodically along the entire length of the rails and separate first rail lower component 84a from first rail upper component 84b. This separation is designed to allow the fall through of cutting dust, keeping the rails clear and smoothly operating. The rails are disposed at an inward angle relative to the carriage lock housing 117. FIG. 21 shows that carriage wheel 146 is disposed between the first rail lower component 84a and the first rail upper component 84b. The carriage wheels 146 are disposed at an inward angle relative to carriage lock housing 117, substantially the same as the angle at which the rails are disposed.

Carriage wheel 146 communicates with carriage wheel axle 146a. Carriage wheel 146 rides on first rail lower component lip 84c. The first rail upper component lip 84d is angled towards carriage wheel 146 to such a degree that the extended lip rests above carriage wheel edge 146c. this configuration is substantially similar for second rail 253h. The component lips of the rails and their position above the carriage wheels rocks the plurality of carriage wheels in their position below the upper rail components and the lower rail components. Carriage wheel axle 146 is disposed within sleeve bracket 153 and communicates with wheel mounting bracket 156 and is attached to carriage lock housing left side wall 154c. Two wheels are thus attached to carriage lock housing left side wall 154c and two wheels are attached to carriage lock housing right side wall 154d in a similar fashion. Turning to FIG. 20B, it can be seen that carriage lock housing 117 is substantially in the shape of rectangular box having carriage lock housing top 154a, carriage lock housing left side wall 154c, carriage lock housing right side wall 154d, carriage lock housing front 154e and carriage lock housing back 154f. Carriage lock housing front 154e contains three apertures. Left rail front aperture 154g has a corresponding and opposed left rail back aperture 154h. Right rail front aperture 154a in carriage lock housing front also has a corresponding and opposed right rail back aperture 154k. Four apertures allow first rail 253g and second rail 253h to pass through carriage lock housing 117. The first rail 253g and second rail 253h are disposed between work station base first transverse rail support 253c and work station base second transverse rail support 253f. The carriage lock housing with its plurality on internally mounted wheels is thus allowed to traverse the length of the rails. This allows the cutter arm positioning assembly to move to and fro. Carriage lock housing front 154e also exhibits front rod aperture 154i through which control rod 124 is disposed. It should be noted that in accordance with FIG. 20B, carriage lock cam housing 149a is mounted to the interior of carriage lock housing front 154e. Turning again to FIG. 19A, it is shown that carriage lock cam housing 149a exhibits opposing side walls specifically first cam housing side wall 149b and second cam housing side wall 149c as well as opposing top and bottom, specifically cam housing top 149d and cam housing bottom 149e. At first cam housing side wall 149b and second cam housing side wall 149c contain corresponding apertures, first side wall cam aperture 149f and second side wall cam aperture 149g. FIG. 20 illustrates cam sleeve 134 that extends through first side wall cam aperture 149f through carriage locking offset cam lobe 135 and then through second side wall cam aperture 149g. Cam sleeve 134 rotates freely within the side wall apertures, however, it is fixed within the carriage locking offset cam lobe 135a, so that cam sleeve cam 134 rotates in conjunction with carriage locking offset cam lobe 135. Cam sleeve 134 is annular in nature with the exception that a portion of the cam is removed along the axis resulting in cam sleeve slot 136 running the length of cam sleeve 134. Carriage locking offset cam lobe 135 also exhibits cam lobe slot 136a corresponding to cam sleeve slot 136. Cam lobe slot 136a is best visualized in FIG. 21. As seen in FIG. 16C, control rod 124 exhibits control rod tab 124a. Control rod tab 124a is configured such that its width and its height, or in other words, the maximum distance it extends from control rod 124 allows it to freely slide within cam sleeve slot 136 and cam lobe slot 136a. Then control rod 124 is drawn forward, such that control rod tab 124a is disposed within cam sleeve slot 136, when control rod 124 is rotated, control rod tab 124a communicates with and in turn rotates cam sleeve 134 which in turn will rotate carriage locking offset cam lobe 135. Returning to FIG. 19A, it will be seen that cam housing bottom 149e is extended to form hinge lip 152. Stop plate 150 is hingeably mounted to hinge lip 152 through stop plate hinge pin 148. At such time as control rod tab 124a is disposed within cam sleeve slot 136 and cam sleeve 134 and consequently, carriage locking offset cam lobe 135 is rotated against stop plate 150. Stop plate 150 is forced against the first rail lower component 84a thus preventing carriage lock housing 117 from moving along first rail 253g, and second rail 253h rotating carriage locking offset cam lobe 135 away from stop plate 150 releases carriage lock housing 117 for movement.

Control rod 124 is not only used to lock carriage lock housing 117 but serves two additional purposes. FIG. 16B shows chop cut activating hinge 126 attached to carriage lower platform 137 through chop cut activating hinge pin 126a. As shown in FIG. 16C, chop cut activating hinge 126 exhibits a longitudinal chop cut activating hinge slot 126b. When control rod tab 124a is located behind chop cut activating hinge 126 as shown in FIGS. 16B and 16C, and is rotated perpendicularly to the longitudinal axis of the chop cut activating hinge slot, then when control rod 124 is drawn forward, control rod tab 124a engages chop cut activating hinge 126 drawing the hinge forward and pulling carriage lower platform 137 downward which results in cutter arm 90 being pulled downward and consequently results in the performance of a chop cut. When control rod 124 is released, tension spring 144 causes carriage lower platform 137 to elevate at the front. Control rod 124 may be positioned such that tab 124a is clear of cam sleeve 134. At this point carriage control handle 118 may be rotated down and out of the way of cutting operations as is illustrated in FIG. 8. FIG. 22A through FIG. 27 show the rip fence and miter gauge 160b. FIG. 24 illustrates the major components being adjustable base 176, arm 171, and fence 159. FIG. 26 illustrates rip fence and miter gauge mounting bracket 178 attached to adjustable base 176, which is in turn is attached to base line 171. FIG. 24 illustrates extension arm 160 mounted within base arm 171 with the opposing end of extension arm pivotally attached to fence 159. Returning to FIG. 26, it is seen that rip fence and miter gauge mounting bracket 178 is in the form of a U-shape of such a dimension that it would slip over front rail 42. Rip fence and miter gauge mounting bracket 178 exhibits mounting bracket tabs 178b which come out above and below the open side of rip fence and miter gauge mounting bracket 178. Tabs 178b prevent the rip fence and miter gauge mounting bracket 178 from being pulled off front rail 42. This arrangement allows the rip fence and miter gauge mounting bracket 178 and consequently the rip fence and miter gauge 160b to slide along the length of front rail 42 keeping in mind that tabs 178b clear both above and below front rail spacers 47. Returning to FIG. 26, it is seen that along the bottom edge of rip fence and miter gauge mounting bracket 178 is mounted internally threaded mounting bracket bridge 170. Externally threaded bridge set screw 164 is disposed within the internally threaded aperture of mounting bracket bridge 170. When bridge set screw 164 is rotated within the internally threaded aperture, bridge set screw 164 makes contact with bridge pressure spring 182, which in turn makes contact with first rail 42 resulting in rip fence and miter gauge mounting bracket 178 being held in a temporarily fixed position along front rail 42. Rip fence and miter gauge mounting bracket 178 is attached to angle bracket 177, which in turn has a vertical angle bracket component 177a and a horizontal angle bracket component 177b. Horizontal angle bracket component 177b contains horizontal angle bracket internally threaded aperture 177c. Angle bracket 177 is mounted such that horizontal angle bracket component 177b is flush with the surface of rip fence and miter gauge mounting bracket 178. Mounting bracket bolt 175a is disposed within semi-circular slot 176a within adjustable base 176. When mounting bracket bolt 175a is rotated, in the appropriate direction, adjustable base 176 is tightened against angle bracket 177 temporarily fixing base arm 171 in position. FIG. 24 shows two of the various positions the rip fence and miter gauge 160b may adopt through its arc. Semi-circular slot 176a exhibits a plurality of adjustment plate set screw seats 176c. The adjustment plate set screw seats 176c are positioned around the semi-circular slot 176a in such a way that when mounting bracket bolt 175a is disposed within the adjustment plate set screw seats 176c, rip fence and miter gauge 160b will adopt a series of predetermined angles relative to front rail 42. Mounting bracket bolt 175a may be tightened at positions between the adjustment set plate set screw seats 176c so that angles between predetermined angles established by the location of adjustment plate set screw seats 176c may be obtained. FIG. 26 also illustrates that base arm 171 pivots upon arm pin 174 which mounted to rip fence and miter gauge mounting bracket 178. The distal end of arm pin 174 is externally threaded and the base arm 171 is retained by base arm threaded knob 173. FIG. 24 illustrates fence 159 with semi-circular fence component 159a and straight edge component 159b. Semi-circular fence component 159a also exhibits fence semi-circular slot 159c.

Fence semi-circular slot 159c is configured substantially similar to semi-circular slot 176a. Turning to FIG. 27, it is seen that fence 159 pivots about fence pin 165. Fence pin 165 exhibits a head and an externally threaded end that is disposed through aperture and third fence surface 159g. Then through apertures in the distal extension arm end 171b, then through a corresponding and opposite aperture in second fence surface 159f. Allowing fence 159 to pivot on the distal extension arm end 171b. FIG. 27 also exhibits horizontal pin plate component 179b attached to the upper surface of extension arm 160. Vertical pin 179c is attached to pin plate 179b. Vertical pin 179c is disposed through fence semi-circular slot 159c. Pressure bushing 183 is then disposed over vertical pin 179c as is vertical pin spring 169, spring washer 186, and internally threaded base arm threaded knob 173a. When base arm threaded knob 173a is tightened, vertical pin spring 169 compresses applying pressure to pressure bushing 183, which rests at some point within fence semi-circular slot 159c or within fence component circular pressure bushing seats 185, which are configured substantially similarly to adjustment plate set screw seats 176a. Thereby keeping fence 159 in a predetermined position.

CONCLUSIONS, RAMIFICATIONS AND SCOPE

The unusual versatility of this machine is apparent from the specification. The cutter arm may be raised or lowered to accommodate any shape or form of workpiece. The cutter arm may be drawn forward through the workpiece and returned to its position ready to cut again. The cutter arm may also operate on the workpiece in a chop cut fashion. By using a routing bit as the cutter many milling operations may be performed on any shape or form of workpiece. The work surface holding the workpiece may be angled as well as adjusted upward or downward again facilitating the unlimited configurations between the cutter and the workpiece. The work surface inserts maybe narrowed or widened again conforming to large workpieces or workpieces of unusual shape.

It is worthy to note that although this machine may perform many functions in orienting and operating on a workpiece, the majority of those functions are control from the front of the machine increasing operator safety.

It will be appreciate that although the description contains many specifities, numerous changes and modification may be made without departing from the scope of the invention. Nothing in the description should be construed as limiting the scope and the foregoing description should be construed in an illustrative and not limitative sense.

What is claimed is:
1. A cutting workstation comprising:
  a cutter arm assembly,
  a cutter arm positioning assembly adjustably mounted to said cutter arm assembly,
  a workstation base frame moveably mounted to said cutter arm positioning assembly,
  a work surface positioning assembly mounted to said workstation base frame,
  a work surface platform adjustably mounted to said work surface positioning assembly,
  a rip fence and miter gauge slidably mounted to said work surface platform wherein said rip fence and miter gauge is demountably attached to said work surface platform and further comprises:
    an adjustable base having a base arm adjusting plate having a adjustment plate semi-circular slot, said adjustment plate semicircular slot having a plurality of adjustment plate set screw seats, said adjustment plate circular set screw seats having conical walls, a base arm fixedly mounted to said base arm adjusting plate, having and internally threaded aperture with an extension arm retaining screw disposed therein, a set screw disposed through said semi-circular slot said set screw having a conical head whereby said conical head is received within said set screw seat, wherein said set screw conical head commutates with said circular set screw seat conical walls, an extension arm slidably mounted within said base arm having a proximal extension arm end and a rounded distal extension arm end, said proximal extension arm end slidably mounted within said base arm, a fence pivotally mounted to said distal extension arm end, said fence further comprising: a straightedge component, a first fence surface whereby contact is made with the work piece, a second fence surface perpendicular to said first fence surface said second fence surface proximal to said work surface said second fence surface having a second fence surface aperture, a third fence surface perpendicular to said first fence surface said third fence surface opposite said second fence surface, said third fence surface having a third fence surface aperture opposite and corresponding to said second fence surface aperture, a semicircular fence component mounted to said straightedge component, said semicircular fence component having a fence component semicircular slot, said fence component semicircular slot having a plurality of fence component circular pressure bushing seats, said fence component circular pressure busing seat having conical walls, a fence position fixing means said fence positioning means further comprising:

a pin plate said pin plate further comprising: a horizontal pin plate component adjustably mounted to said extension arm, a vertical pin fixedly mounted to said horizontal pin plate component said vertical pin having a externally threaded end, said vertical pin disposed through and said third fence surface semicircular slot, a set screw assembly said set screw assembly further comprising:

a pressure bushing having a conical head, said pressure busing slidably disposed over said vertical pin and communicating with said third fence surface semicircular slot, said pressure busing conical head received within said fence component circular pressure bushing seats wherein said conical walls of said fence component circular pressure bushing seats communicate with said pressure busing conical walls, a spring disposed over said vertical pin communicating pressure bushing, a spring washer disposed over said vertical pin communicating with said spring, an internally threaded knob disposed over said vertical pin, a rip fence and miter gauge mounting bracket pivotally mounted to said base arm adjustment plate, said rip fence and miter gauge mounting bracket further comprising:

an angle bracket having a horizontal angle bracket component having a horizontal angle bracket internally threaded aperture, a vertical angle bracket component, a sliding bracket mounted to said angle bracket, said sliding bracket further comprising:

a first horizontal sliding bracket component, a vertical sliding bracket component mounted to said first horizontal sliding bracket component, a second horizontal sliding bracket component mounted to said vertical sliding bracket component whereby said square rail is enclosed on three sides, a plurality of mounting bracket tabs mounted to said first horizontal component and second horizontal component, whereby said sliding bracket is retained on said square rail, a bridge mounted to said second horizontal sliding bracket component having an internally treaded aperture, a bridge set screw disposed within said bridge internally threaded aperture, a bridge pressure spring, mounted to said bridge, said bridge pressure spring communicating with said square rail whereby frictional pressure is created between said rip fence and miter gauge mounting bracket and said bridge, said pressure spring further communicating with said set screw.

\* \* \* \* \*